US012590217B2

(12) United States Patent
Fukuda

(10) Patent No.: US 12,590,217 B2
(45) Date of Patent: Mar. 31, 2026

(54) AQUEOUS PIGMENT DISPERSION

(71) Applicant: KAO CORPORATION, Tokyo (JP)

(72) Inventor: Teruyuki Fukuda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 161 days.

(21) Appl. No.: 18/259,188

(22) PCT Filed: Dec. 27, 2021

(86) PCT No.: PCT/JP2021/048605

§ 371 (c)(1),
(2) Date: Jun. 23, 2023

(87) PCT Pub. No.: WO2022/145425

PCT Pub. Date: Jul. 7, 2022

(65) Prior Publication Data

US 2024/0059916 A1 Feb. 22, 2024

(30) Foreign Application Priority Data

Dec. 28, 2020 (JP) ................................ 2020-219532

(51) Int. Cl.
*C09D 11/326* (2014.01)
*C09D 7/45* (2018.01)
*C09D 11/322* (2014.01)
*C09D 17/00* (2006.01)

(52) U.S. Cl.
CPC .............. *C09D 11/326* (2013.01); *C09D 7/45* (2018.01); *C09D 11/322* (2013.01); *C09D 17/003* (2013.01)

(58) Field of Classification Search
CPC ...................................................... C09D 1/322
See application file for complete search history.

(56) References Cited

U.S. PATENT DOCUMENTS

| | | | | |
|---|---|---|---|---|
| 2011/0184097 | A1 | 7/2011 | Fechner et al. | |
| 2016/0264799 | A1 | 9/2016 | Uemura et al. | |
| 2018/0215935 | A1* | 8/2018 | Il | B41M 5/0023 |
| 2018/0311968 | A1 | 11/2018 | Sato et al. | |
| 2019/0212648 | A1 | 7/2019 | Kawashima et al. | |
| 2019/0284410 | A1* | 9/2019 | Azuma | C09D 11/322 |
| 2020/0216580 | A1 | 7/2020 | Nakanishi | |
| 2021/0238431 | A1 | 8/2021 | Yoda et al. | |
| 2022/0127485 | A1* | 4/2022 | Sakai | C09B 67/009 |

FOREIGN PATENT DOCUMENTS

| | | | |
|---|---|---|---|
| CN | 101360799 | A | 2/2009 |
| CN | 102015863 | A | 4/2011 |
| CN | 105612226 | A | 5/2016 |
| CN | 108136770 | A | 6/2018 |
| CN | 110832042 | A | 2/2020 |
| JP | 2000-313837 | A | 11/2000 |
| JP | 2004-346174 | A | 12/2004 |
| JP | 2007-22938 | A | 2/2007 |
| JP | 2011-202004 | A | 10/2011 |
| JP | 2013-10811 | A | 1/2013 |
| JP | 2014-201741 | A | 10/2014 |
| JP | 2015-14872 | A | 1/2015 |
| JP | 2017-39922 | A | 2/2017 |
| JP | 2018-104545 | A | 7/2018 |
| JP | 2019-14872 | A | 1/2019 |
| JP | 2019-44069 | A | 3/2019 |
| JP | 2019-127589 | A | 8/2019 |
| JP | 2019-214717 | A | 12/2019 |
| JP | 2020-104478 | A | 7/2020 |
| WO | WO 2018/061891 | A1 | 4/2018 |
| WO | WO 2019/065512 | A1 | 4/2019 |
| WO | WO 2019/142495 | A1 | 7/2019 |

OTHER PUBLICATIONS

International Search Report issued on Mar. 22, 2022 in PCT/JP2021/048605 (with English translation), 5 pages.
Wu et al., "Polymer Dispersants for Water-based Coatings/inks", Coatings Industry, Issue 1, 1999, pp. 31-34 (with unedited computer-generated English translation).
Pihui Pi et al., "Aluminum Pigments Encapsulated with Hybrid Silica Film with Carboxyl Groups and Their Stability and Dispersibility in Aqueous Media," The Canadian Journal of Chemical Engineering, vol. 93, Jun. 2015, pp. 1101-1106.
Extended European Search Report issued Oct. 24, 2024 in European Patent Application No. 21915284.0, 6 pages.

* cited by examiner

*Primary Examiner* — Shelby L Fidler
(74) *Attorney, Agent, or Firm* — Oblon, McClelland, Maier & Neustadt, L.L.P.

(57) ABSTRACT

A water-based pigment dispersion including an aluminum lake pigment (A) and a pigment dispersant (B). The pigment dispersant (B) is a polymer containing a constituent unit derived from an anionic group-containing monomer (b-1) and a constituent unit derived from a hydrophilic nonionic monomer (b-2) containing an oxyalkylene group. A water-based ink for ink-jet recording, including the water-based pigment dispersion and a water-soluble organic solvent (C).

20 Claims, No Drawings

AQUEOUS PIGMENT DISPERSION

CROSS REFERENCE TO RELATED APPLICATIONS

This application is a National Stage entry under 35 U.S.C. § 371 of PCT/JP2021/048605, filed on Dec. 27, 2021, and claims priority to Japanese Patent Application No. 2020-219532, filed on Dec. 28, 2020. The entire contents of both are incorporated herein by reference.

FIELD OF THE INVENTION

The present invention relates to a water-based pigment dispersion and a water-based ink for ink-jet recording containing the water-based pigment dispersion.

BACKGROUND OF THE INVENTION

An ink-jet recording system is a recording system in which ink droplets are directly ejected from very fine nozzles and attached to recording media to obtain a printed article on which characters and images are recorded, and is a recording system which does not use a plate unlike conventional recording systems, and therefore, is expected in a wide range of application fields as on-demand printing which can cope with a small amount and many kinds of products. Recently, application of the ink-jet recording system to pharmaceuticals and foods has been studied.

For example, JP 2019-127589 A (PTL 1) describes an edible pigment composition containing at least a lake pigment, a pigment dispersant, and a dispersion stabilizer for the purpose of providing a pigment composition having excellent dispersion stability (storage stability) of the lake pigment, or the like, a water-based ink composition for ink-jet, and the like.

SUMMARY OF THE INVENTION

The present invention relates to a water-based pigment dispersion containing an aluminum lake pigment (A) and a pigment dispersant (B), in which the pigment dispersant (B) is a polymer containing a constituent unit derived from an anionic group-containing monomer (b-1) and a constituent unit derived from a hydrophilic nonionic monomer (b-2) containing an oxyalkylene group.

DETAILED DESCRIPTION OF THE INVENTION

Here, the aluminum lake pigment is a pigment formed by adsorbing an originally water-soluble food dye having a carboxy group or a sulfonic acid group on the surface of an aluminum hydroxide gel by the aggregation action of the polycationic aluminum hydroxide gel. Therefore, the aluminum lake pigment is generally a pigment which is difficult to disperse in water, and when the aluminum lake pigment is intended to be dispersed in water, the aluminum lake pigment is often gelled in a state where water is incorporated.

In addition, for example, even when the pigment can be temporarily dispersed by a pigment dispersant having an anionic functional group, aluminum ions eluted from the aluminum lake pigment degenerate an electric double layer formed by the anionic functional group of the pigment dispersant, and therefore, flocculation of the pigment particles due to collision caused by Brownian motion cannot be suppressed, the particle diameter of the pigment particles increases, and sedimentation of the pigment particles occurs.

In Examples of PTL 1, sodium polyacrylate is used as a pigment dispersant. Sodium polyacrylate is expected to be stably adsorbed on the surfaces of aluminum lake pigments because the carboxy groups are oriented in the polycationic aluminum hydroxide gel. However, it has been found that the pigments cannot be micronized to such a particle size that the ink can be ejected in an ink-jet recording system, and the storage stability at normal temperature (25° C.) is insufficient. Furthermore, in the application of a water-based ink using an aluminum lake pigment to an ink-jet recording system, it is also required to improve ejection property, and it is also required to have excellent decap property such that blurring is less likely to occur when the ink nozzle surface is left unprotected after printing and printing is started again.

The present invention relates to a water-based pigment dispersion in which a pigment has a small dispersed particle diameter and which is excellent in storage stability at normal temperature, and a water-based ink which is excellent in ejection property and decap property when used in an ink-jet recording system.

The present inventor has found that a water-based pigment dispersion containing an aluminum lake pigment and a pigment dispersant, in which the pigment dispersant is a polymer containing a constituent unit derived from a specific monomer, can provide a water-based pigment dispersion having a small dispersed particle diameter of the pigment and excellent storage stability at normal temperature, and a water-based ink excellent in ejection property and decap property when used in an ink-jet recording system.

That is, the present invention relates to the following [1] and [2].

[1] A water-based pigment dispersion containing an aluminum lake pigment (A) and a pigment dispersant (B), in which the pigment dispersant (B) is a polymer containing a constituent unit derived from an anionic group-containing monomer (b-1) and a constituent unit derived from a hydrophilic nonionic monomer (b-2) containing an oxyalkylene group.

[2] A water-based ink for ink-jet recording, containing the water-based pigment dispersion as set forth in [1], and a water-soluble organic solvent (C).

According to the present invention, it is possible to provide a water-based pigment dispersion in which the dispersed particle diameter of a pigment is small and which is excellent in storage stability at normal temperature, and a water-based ink which is excellent in ejection property and decap property when used in an ink-jet recording system.

[Water-Based Pigment Dispersion]

The water-based pigment dispersion of the present invention (hereinafter, also simply referred to as "pigment dispersion") is a water-based pigment dispersion containing an aluminum lake pigment (A) and a pigment dispersant (B), in which the pigment dispersant (B) is a polymer containing a constituent unit derived from an anionic group-containing monomer (b-1) and a constituent unit derived from a hydrophilic nonionic monomer (b-2) containing an oxyalkylene group.

In the description herein, the term "water-based" means that water accounts for the largest proportion in a medium.

The present invention can provide a water-based pigment dispersion in which the dispersed particle diameter of the pigment is small and which is excellent in storage stability at normal temperature (hereinafter, also referred to as "normal temperature storage stability"), and further can provide a water-based ink which is excellent in ejection property and decap property when used in an ink-jet recording system. The reason for this is not clear, but is considered to be as follows.

The pigment dispersion of the present invention contains an aluminum lake pigment, and the pigment dispersant is a polymer containing a constituent unit derived from an anionic group-containing monomer and a constituent unit derived from a hydrophilic nonionic monomer having an oxyalkylene group.

Here, it is considered that the anionic group introduced into the polymer by the anionic group-containing monomer is oriented and adsorbed on the surface of the aluminum hydroxide gel of the aluminum lake pigment, and the flocculation and sedimentation of the pigment particles are suppressed by an electric repulsive force, thereby contributing to the reduction of the dispersed particle diameter. Further, it is considered that the oxyalkylene group introduced into the polymer by the hydrophilic nonionic monomer increases the affinity of the vicinity of the surface of the aluminum lake pigment for water contained as a medium, and the surface of the aluminum lake pigment is covered with a water molecular layer, so that a steric repulsive force is generated by the water molecular layer to prevent contact between the pigment particles and also prevent flocculation of the pigment particles, thereby suppressing an increase in the particle diameter of the pigment particles. As a result, it is considered that the dispersed particle diameter of the pigment in the pigment dispersion can be reduced, the storage stability at normal temperature can be improved, and further, the ejection property and the decap property can be improved when used in an ink-jet recording system.

<Aluminum Lake Pigment (A)>

The pigment dispersion of the present invention contains an aluminum lake pigment (A).

The aluminum lake pigment (A) is composed of a dye component (α) that exhibits coloring power and an aluminum hydroxide gel (β) that adsorbs a dye.

The dye component (α) is preferably obtained by introducing a hydrophilic functional group such as a sulfonic acid group or a carboxy group into an aromatic ring in the molecule from the viewpoint of detoxification of a tar pigment, and thus has high water solubility. From the viewpoint of making the dye component having such a chemical structure into a water-insoluble pigment, the aluminum lake pigment (A) is preferably obtained by bonding the dye component (α) onto an aluminum hydroxide gel (β) carrier existing in the form of polymerized aluminum ion $[Al_{n+2}(OH)_{3n}]^{6+}$ where n=10 or more.

The aluminum lake pigment (A) is not particularly limited, but is preferably a pigment using, as a dye component (α), at least one selected from the group consisting of Yellow No. 4, Yellow No. 5, Red No. 2, Red No. 3, Red No. 40, Red No. 102, Red No. 10441), Green No. 3, Blue No. 1, and Blue No. 2, and more preferably one or more selected from the group consisting of Yellow No. 4 aluminum lake, Yellow No. 5 aluminum lake, Blue No. 1 aluminum lake, and Red No. 104-(1) aluminum lake, from the viewpoint of reducing the dispersed particle diameter of the pigment and improving the storage stability at normal temperature, and from the viewpoint of improving the ejection property and the decap property.

<Pigment Dispersant (B)>

The pigment dispersion of the present invention contains a pigment dispersant (B) (hereinafter, also simply referred to as "dispersant (B)").

The dispersant (B) is a polymer containing a constituent unit derived from an anionic group-containing monomer (b-1) and a constituent unit derived from a hydrophilic nonionic monomer containing an oxyalkylene group (hereinafter, also simply referred to as a "hydrophilic nonionic monomer") (b-2).

The dispersant (B) is obtained by copolymerizing raw material monomers including the anionic group-containing monomer (b-1) and the hydrophilic nonionic monomer (b-2).

(Anionic Group-Containing Monomer (b-1))

The dispersant (B) according to the present invention contains a constituent unit derived from an anionic group-containing monomer (b-1). It is considered that the anionic group introduced into the polymer as the dispersant (B) by the anionic group-containing monomer (b-1) is oriented in the aluminum hydroxide gel (β) portion of the aluminum lake pigment (A), whereby the dispersant (B) can be adsorbed on the aluminum lake pigment (A), whereby the dispersed particle diameter of the pigment can be reduced, the normal temperature storage stability can be improved, and the ejection property and the decap property can be improved.

The anionic group is not particularly limited, and examples thereof include a carboxy group, a sulfonic acid group, and a phosphoric acid group. From the viewpoint of reducing the dispersed particle diameter of the pigment and improving the normal temperature storage stability, and from the viewpoint of improving the ejection property and the decap property, the anionic group is preferably a carboxy group.

Examples of the carboxy group-containing monomer include monocarboxylic acid-based monomers such as (meth)acrylic acid, 2-ethylacrylic acid, α-chloroacrylic acid, α-cyanoacrylic acid, β-methylacrylic acid (crotonic acid), α-phenylacrylic acid, β-acryloyloxypropionic acid, sorbic acid, α-chlorosorbic acid, angelic acid, cinnamic acid, p-chlorocinnamic acid, and β-styrylacrylic acid (1-carboxy-4-phenylbutadiene-1,3); dicarboxylic acid-based monomers such as fumaric acid, maleic acid, maleic anhydride, itaconic acid, citraconic acid, mesaconic acid, and glutaconic acid; and tricarboxylic acid-based monomers such as aconitic acid and tricarboxyethylene.

Among these, the anionic group-containing monomer (b-1) is preferably a carboxy group-containing monomer, more preferably a monocarboxylic acid-based monomer, still more preferably (meth)acrylic acid, and even more preferably methacrylic acid, from the viewpoint of reducing the dispersed particle diameter of the pigment and improving the normal temperature storage stability, and from the viewpoint of improving the ejection property and the decap property.

In the description herein, "(meth)acrylic acid" means one or more selected from the group consisting of acrylic acid and methacrylic acid. Hereinafter, "(meth)acrylic acid" also has the same meaning.

(Hydrophilic Nonionic Monomer Containing Oxyalkylene Group (b-2))

The dispersant (B) according to the present invention contains a constituent unit derived from a hydrophilic nonionic monomer (b-2) containing an oxyalkylene group.

In the present invention, the "hydrophilicity" of the monomer means that when the monomer is dissolved in 100 g of ion-exchanged water at 25° C. until saturation, the amount of the dissolved monomer is not less than 10 g.

The hydrophilic nonionic monomer (b-2) is not particularly limited as long as it has an oxyalkylene group and a polymerizable group in the molecule.

The oxyalkylene group preferably has 2 or more and 4 or less carbon atoms. Specific examples of the oxyalkylene group include an oxyethylene group, an oxypropylene group, and an oxybutylene group, but from the viewpoint of reducing the dispersed particle diameter of the pigment and improving the normal temperature storage stability, and from the viewpoint of improving the ejection property and the decap property, the oxyalkylene group is preferably one or more selected from the group consisting of an oxyethylene group and an oxypropylene group, and more preferably an oxyethylene group.

The polymerizable group is a group having a radically polymerizable unsaturated double bond, and examples thereof include one or more selected from the group consisting of a vinyl group, an allyl group, an acryloyl group, a methacryloyl group, a propenyl group, a vinylidene group, and a vinylene group. Among these, the polymerizable group is preferably a vinyl group, an allyl group, an acryloyl group, or a methacryloyl group.

Specific examples of the hydrophilic nonionic monomer (b-2) include hydroxyalkyl (meth)acrylates such as 2-hydroxyethyl (meth)acrylate and 3-hydroxypropyl (meth)acrylate; polyalkylene glycol (meth)acrylates; alkoxypolyalkylene glycol (meth)acrylates; and polyalkylene glycol monoallyl ethers.

Among these, the hydrophilic nonionic monomer (b-2) is preferably a monomer having a polyalkylene glycol chain, and more preferably a monomer having a polyoxyalkylene group, from the viewpoint of reducing the dispersed particle diameter of the pigment and improving the normal temperature storage stability, and from the viewpoint of improving the ejection property and the decap property.

The average addition mole number of the alkylene oxide of the polyalkylene glycol chain or the polyoxyalkylene group is a number of preferably 2 or more, more preferably 4 or more, and still more preferably 9 or more from the same viewpoints as described above, and is a number of preferably 120 or less, more preferably 90 or less, still more preferably 45 or less, and even more preferably 35 or less from the same viewpoints as described above. When the average addition mole number is within the above range, the storage stability at a high temperature (hereinafter, also referred to as "high temperature storage stability") can be maintained for a long period of time.

The polyalkylene glycol chain or the polyoxyalkylene group may include a unit derived from ethylene oxide and a unit derived from propylene oxide. The molar ratio of the unit derived from ethylene oxide (EO) to the unit derived from propylene oxide (PO), [EO/PO] is preferably 1 or more, more preferably 1.1 or more, and still more preferably 1.2 or more, and is preferably 9 or less, more preferably 6 or less, still more preferably 3 or less, and even more preferably 2 or less.

The constituent unit derived from the hydrophilic nonionic monomer (b-2) is preferably a constituent unit derived from polyalkylene glycol (meth)acrylate represented by the following formula (1), from the viewpoint of reducing the dispersed particle diameter of the pigment and improving the normal temperature storage stability, and from the viewpoint of improving the ejection property and the decap property.

In the present invention, "(meth)acrylate" means one or more selected from the group consisting of acrylate and methacrylate. Hereinafter, "(meth)acrylate" also has the same meaning.

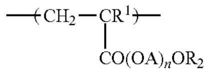

(1)

In the formula (1), $R^1$ represents a hydrogen atom or a methyl group, $R^2$ represents a hydrogen atom or an alkyl group having 1 or more and 20 or less carbon atoms, OA represents an oxyalkylene group having 2 or more and 4 or less carbon atoms, and n represents an average addition mole number of alkylene oxides and is a number of 2 or more and 120 or less.

In the formula (1), the number of carbon atoms of OA which is an oxyalkylene group is preferably 2 or more and 3 or less, and more preferably 2, from the viewpoint of reducing the dispersed particle diameter of the pigment and improving the normal temperature storage stability, and from the viewpoint of improving the ejection property and the decap property. That is, the oxyalkylene group OA is preferably one or more selected from the group consisting of an oxyethylene group and an oxypropylene group, and more preferably an oxyethylene group, from the same viewpoints as described above.

In the formula (1), $R^1$ is preferably a methyl group from the viewpoint of dispersion stability of the pigment dispersion.

In the formula (1), $R^2$ is preferably a hydrogen atom or an alkyl group having 1 or more and 8 or less carbon atoms, more preferably a hydrogen atom or an alkyl group having 1 or more and 3 or less carbon atoms, and still more preferably a methyl group, from the viewpoints of reducing the dispersed particle diameter of the pigment and improving the normal temperature storage stability and from the viewpoint of improving the ejection property and the decap property. The alkyl group may be linear or branched.

In the formula (1), the average addition mole number n is a number of preferably 4 or more, and more preferably 9 or more, from the viewpoint of reducing the dispersed particle diameter of the pigment and improving the normal temperature storage stability, further from the viewpoint of improving the high temperature storage stability, and from the viewpoint of improving the ejection property and the decap property, and it is a number of preferably 90 or less, more preferably 45 or less, and still more preferably 35 or less, from the same viewpoints as described above.

The n oxyalkylene groups may be the same as or different from each other. When the oxyalkylene groups are different from each other, the addition may be any of block addition, random addition, and alternate addition.

The polyalkylene glycol (meth)acrylate constituting the constituent unit represented by the formula (1) is preferably one or more selected from the group consisting of polyethylene glycol mono(meth)acrylate, (polyethylene glycol/polypropylene glycol) (meth)acrylate, alkoxy polyethylene glycol (meth)acrylate, and alkoxy (polyethylene glycol/polypropylene glycol) (meth)acrylate, and more preferably one or more selected from the group consisting of polyethylene glycol mono(meth)acrylate and alkoxy polyethylene glycol (meth)acrylate.

Specifically, the alkoxy polyethylene glycol (meth)acrylate is preferably one or more selected from the group consisting of methoxy polyethylene glycol mono(meth)acrylate, ethoxy polyethylene glycol mono(meth)acrylate, prop oxy polyethylene glycol mono(meth)acrylate, butoxy polyethylene glycol mono(meth)acrylate, octoxy polyethylene glycol mono(meth)acrylate, and stearoxy polyethylene glycol mono(meth)acrylate, more preferably one or more selected from the group consisting of methoxy polyethylene glycol mono(meth)acrylate, ethoxy polyethylene glycol mono(meth)acrylate, prop oxy polyethylene glycol mono (meth)acrylate, butoxy polyethylene glycol mono(meth) acrylate, and octoxy polyethylene glycol mono(meth)acrylate, still more preferably one or more selected from the group consisting of methoxy polyethylene glycol mono (meth)acrylate, ethoxy polyethylene glycol mono(meth) acrylate, and propoxy polyethylene glycol mono(meth)acrylate, and even more preferably methoxy polyethylene glycol mono(meth)acrylate.

As described above, the hydrophilic nonionic monomer (b-2) is preferably alkoxy polyethylene glycol mono(meth) acrylate, more preferably alkoxy polyethylene glycol mono (meth)acrylate having an alkoxy group having 1 or more and 20 or less carbon atoms, still more preferably alkoxy polyethylene glycol mono(meth)acrylate having an alkoxy group having 1 or more and 8 or less carbon atoms, even more preferably alkoxy polyethylene glycol mono(meth)acrylate having an alkoxy group having 1 or more and 3 or less carbon atoms, yet still more preferably one or more selected from the group consisting of methoxy polyethylene glycol mono(meth)acrylate, ethoxy polyethylene glycol mono (meth)acrylate, and propoxy polyethylene glycol mono (meth)acrylate, and yet even more preferably methoxy polyethylene glycol mono(meth)acrylate.

Specific examples of the commercially available hydrophilic nonionic monomer (b-2) include NK Ester M-20G, NK Ester M-40G, NK Ester M-90G, NK Ester M-230G, NK Ester M-450G, and NK Ester M-900G (all manufactured by Shin-Nakamura Chemical Co., Ltd.); BLEMMER PME-1000, BLEMMER PME-4000, and BLEMMER 50POEP-800B (all manufactured by NOF CORPORATION); and LIGHT ESTER 041MA (manufactured by Kyoeisha Chemical Co., Ltd.).

The dispersant (B) may have a constituent unit derived from a monomer other than the constituent unit derived from the anionic group-containing monomer (b-1) and the constituent unit derived from the hydrophilic nonionic monomer (b-2) as long as the effects of the present invention are not impaired. Examples of the other monomer include a hydrophilic nonionic monomer other than the hydrophilic nonionic monomer (b-2); and a hydrophobic monomer.

In the description herein, the term "hydrophobic monomer" refers to a monomer having a dissolution amount of less than 10 g when the monomer is dissolved to saturation in 100 g of ion-exchanged water at 25° C.

Examples of the hydrophilic nonionic monomer other than the hydrophilic nonionic monomer (b-2) include (meth) acrylamide; N-vinyl-2-pyrrolidone; and N-alkyl (meth)acrylamide.

Examples of the hydrophobic monomer include an aromatic group-containing monomer and a (meth)acrylate having a hydrocarbon group derived from an aliphatic alcohol.

The aromatic group-containing monomer is preferably a vinyl monomer having an aromatic group having 6 or more and 22 or less carbon atoms, which may have a substituent containing a hetero atom, and more preferably one or more selected from the group consisting of a styrene-based monomer and an aromatic group-containing (meth)acrylate. The molecular weight of the aromatic group-containing monomer is preferably less than 500.

Examples of the styrene-based monomer include styrene, α-methylstyrene, 2-methylstyrene, 4-vinyltoluene (4-methylstyrene), and divinylbenzene.

Examples of the aromatic group-containing (meth)acrylate include phenyl (meth)acrylate, benzyl (meth)acrylate, and phenoxyethyl (meth)acrylate.

The (meth)acrylate having a hydrocarbon group derived from an aliphatic alcohol is preferably a (meth)acrylate having a hydrocarbon group derived from an aliphatic alcohol having 1 or more and 22 or less carbon atoms. Examples thereof include (meth)acrylates having a linear or branched alkyl group having 1 or more and 22 or less carbon atoms; and (meth)acrylates having an alicyclic alkyl group such as cyclohexyl (meth)acrylate.

The content of the constituent unit derived from the anionic group-containing monomer (b-1) in all the constituent units of the dispersant (B) is preferably 3% by mass or more, more preferably 7% by mass or more, still more preferably 10% by mass or more, and even more preferably 15% by mass or more from the viewpoint of reducing the dispersed particle diameter of the pigment and improving the normal temperature storage stability, further from the viewpoint of improving the high temperature storage stability, and from the viewpoint of improving the ejection property and the decap property, and from the same viewpoints as described above, the content is preferably 55% by mass or less, more preferably 50% by mass or less, still more preferably 45% by mass or less, even more preferably 40% by mass or less, yet still more preferably 35% by mass or less, yet even more preferably 30% by mass or less, and further more preferably 20% by mass or less.

The content of the constituent unit derived from the hydrophilic nonionic monomer (b-2) in all the constituent units of the dispersant (B) is preferably 45% by mass or more, more preferably 50% by mass or more, still more preferably 55% by mass or more, even more preferably 60% by mass or more, yet still more preferably 65% by mass or more, yet even more preferably 70% by mass or more, and further more preferably 80% by mass or more from the viewpoint of reducing the dispersed particle diameter of the pigment and improving the normal temperature storage stability, further from the viewpoint of improving the high temperature storage stability, and from the viewpoint of improving the ejection property and the decap property, and from the same viewpoints as described above, the content is preferably 97% by mass or less, more preferably 93% by mass or less, still more preferably 90% by mass or less, and even more preferably 85% by mass or less.

When the dispersant (B) contains a constituent unit derived from a hydrophobic monomer, the content of the constituent unit derived from a hydrophobic monomer is preferably 10% by mass or less, more preferably 7% by mass or less, still more preferably 5% by mass or less, and even more preferably 3% by mass or less, from the viewpoint of improving the adsorptivity of the dispersant to an aluminum lake pigment in a water-based medium, reducing the dispersed particle diameter of the pigment, and improving the normal temperature storage stability, and from the viewpoint of improving the ejection property and the decap property.

As described above, the dispersant (B) may have a constituent unit other than the constituent unit derived from the anionic group-containing monomer (b-1) and the constituent unit derived from the hydrophilic nonionic monomer (b-2) within a range that does not impair the effects of the present invention, but the total content of the constituent unit derived from the anionic group-containing monomer (b-1) and the constituent unit derived from the hydrophilic nonionic monomer (b-2) is preferably 70% by mass or more, more preferably 80% by mass or more, still more preferably 90% by mass or more, and even more preferably 95% by mass or more, and the upper limit is 100% by mass, and yet still more preferably 100% by mass, that is, the dispersant (B) consists only of the constituent unit derived from the anionic group-containing monomer (b-1) and the constituent unit derived from the hydrophilic nonionic monomer (b-2), from the viewpoint of reducing the dispersed particle diameter of the pigment and improving the normal temperature storage stability, further from the viewpoint of improving the high temperature storage stability, and from the viewpoint of improving the ejection property and the decap property.

The dispersant B preferably contains a constituent unit derived from (meth)acrylic acid as the anionic group-containing monomer (b-1) and a constituent unit derived from alkoxy polyalkylene glycol (meth)acrylate as the monomer (b-2), and more preferably contains a constituent unit derived from (meth)acrylic acid as the anionic group-containing monomer (b-1) and a constituent unit derived from methoxy polyethylene glycol (meth)acrylate as the hydrophilic nonionic monomer (b-2), from the viewpoint of reducing the dispersed particle diameter of the pigment and improving the normal temperature storage stability, further from the viewpoint of improving the high temperature storage stability, and from the viewpoint of improving the ejection property and the decap property.

As the dispersant B, a dispersant synthesized by a known polymerization method may be used, or a commercially available product may be used.

As described above, in the present invention, it is considered that since the dispersant (B) has the oxyalkylene group introduced by the hydrophilic nonionic monomer (b-2), a steric repulsive force is generated by a water molecular layer covering the surface of the aluminum lake pigment, and thus, flocculation of the pigment particles can be suppressed, an increase in the particle diameter of the pigment particles can be suppressed, the dispersed particle diameter of the pigment can be reduced, the normal temperature storage stability can be improved, and further the ejection property and the decap property can be improved. Such an effect of the present invention is more effectively exhibited when the oxyalkylene group of the hydrophilic nonionic monomer (b-2) is preferably a polyoxyalkylene group, and further the high temperature storage stability can also be improved. Such an effect is considered to depend on the type of the polyoxyalkylene group (the average addition mole number of the alkylene oxide) and the number of the polyoxyalkylene group introduced into the dispersant (B). From this viewpoint, the number of moles of the hydrophilic nonionic monomer (b-2) in 100 g of the dispersant (B) is preferably 0.01 or more, more preferably 0.03 or more, and still more preferably 0.05 or more, and is preferably 0.5 or less, more preferably 0.4 or less, still more preferably 0.3 or less, even more preferably 0.2 or less, yet still more preferably 0.1 or less, and yet even more preferably 0.08 or less, as an indicator of the type of the polyoxyalkylene group (the average addition mole number of the alkylene oxide) and the number of the polyoxyalkylene group introduced into the dispersant (B).

The number of moles of the hydrophilic nonionic monomer (b-2) in 100 g of the dispersant (B) can be calculated from the monomer composition of the dispersant (B) and the molecular weight of the hydrophilic nonionic monomer (b-2).

As described above, in the present invention, since the dispersant (B) has an anionic group introduced by the anionic group-containing monomer (b-1), it is considered that the anionic group is oriented and adsorbed on the surface of the aluminum hydroxide gel of the aluminum lake pigment, and the flocculation and sedimentation of the pigment particles are suppressed by an electric repulsive force, thereby contributing to the reduction of the dispersed particle diameter. On the other hand, since the anionic group also has a function of increasing the solubility of the dispersant (B) in a water-based medium, it is considered that the dispersion stability of the pigment dispersion also depends on the type of the anionic group and the number of the anionic group introduced into the dispersant (B). From this viewpoint, the number of moles of the anionic group-containing monomer (b-1) in 100 g of the dispersant (B) is preferably 0.01 or more, more preferably 0.05 or more, still more preferably 0.1 or more, and even more preferably 0.15 or more, and is preferably 0.7 or less, more preferably 0.5 or less, still more preferably 0.4 or less, even more preferably 0.3 or less, and yet still more preferably 0.25 or less, as an indicator of the type of the anionic group introduced into the dispersant (B) and the number of the anionic groups.

It is considered that, in a case where the number of moles of the anionic group-containing monomer (b-1) in 100 g of the dispersant (B) is within the above range, especially with respect to the dispersion stability of the pigment dispersion, the number of the anionic group introduced into the dispersant (B) falls within an appropriate range, the anionic groups are sufficiently adsorbed on the surface of the aluminum hydroxide gel of the aluminum lake pigment, and the solubility of the dispersant (B) in a water-based medium can be adjusted, the dispersion stability of the pigment dispersion can be improved, the dispersed particle diameter of the pigment can be reduced, the normal temperature storage stability can be improved, and further, the ejection property and the decap property can be improved.

The number of moles of the anionic group-containing monomer (b-1) in 100 g of the dispersant (B) can be calculated from the monomer composition of the dispersant (B) and the molecular weight of the anionic group-containing monomer (b-1).

The ratio of the number of moles of the constituent unit derived from the hydrophilic nonionic monomer (b-2) to the number of moles of the constituent unit derived from the anionic group-containing monomer (b-1) contained in the dispersant (B) (hereinafter, also referred to as molar ratio [{monomer (b-2)}/{monomer (b-1)}]) is preferably 0.05 or more, more preferably 0.1 mol or more, still more preferably 0.15 or more, even more preferably 0.2 or more, and yet still more preferably 0.25 or more from the viewpoint of adjusting the type and number of the anionic group and polyoxyalkylene group introduced into the dispersant (B), improving the dispersion stability of the pigment dispersion, reducing the dispersed particle diameter of the pigment, and improving the normal temperature storage stability, further from the viewpoint of improving the high temperature storage stability, and from the viewpoint of improving the ejection property and the decap property, and it is preferably 2.5 or less, more preferably 2 or less, still more preferably 1.7 or less, even more preferably 1.5 or less, yet still more preferably 1.3 or less, yet even more preferably 1 or less, further more preferably 0.7 or less, and still further more preferably 0.5 or less from the same viewpoints as described above.

The dispersant (B) is preferably synthesized by a solution polymerization method from the viewpoint of controlling the molecular weight.

The solvent used in the solution polymerization method is not particularly limited, and preferable examples thereof include water; aliphatic alcohols having 1 or more and 3 or less carbon atoms; ketones having 3 or more and 8 or less carbon atoms; esters such as ethyl acetate; and a mixed solvent of one or more of these and water. Among these, water is preferable from the viewpoint that the solvent can be used as it is without being removed when a pigment dispersion is produced as described later.

In the polymerization, a polymerization initiator or a polymerization chain transfer agent can be used.

Any polymerization initiator can be used as long as it is used in ordinary solution polymerization, but a persulfate salt is preferable, and an ammonium persulfate salt is more preferable.

The chain transfer agent is preferably a mercaptan, and more preferably 2-mercaptoethanol.

The amount of the polymerization initiator to be used is preferably 0.01 parts by mass or more, more preferably 0.05 parts by mass or more, and still more preferably 0.1 parts by mass or more, with respect to 100 parts by mass of the total amount of the raw material monomers of the dispersant (B), from the viewpoint of the molecular weight distribution of the dispersant (B), and is preferably 5 parts by mass or less, more preferably 3 parts by mass or less, and still more preferably 2 parts by mass or less from the same viewpoint as described above.

The amount of the chain transfer agent to be used is preferably 0.01 parts by mass or more, more preferably 0.05 parts by mass or more, and still more preferably 0.1 parts by mass or more, with respect to 100 parts by mass of the total amount of the raw material monomers of the dispersant (B), from the viewpoint of the molecular weight distribution of the dispersant (B), and is preferably 5 parts by mass or less, more preferably 3 parts by mass or less, and still more preferably 2 parts by mass or less from the same viewpoint as described above.

Preferable polymerization conditions vary depending on the type of the polymerization initiator and the like, but the polymerization temperature is preferably 50° C. or higher and 90° C. or lower, and the polymerization time is preferably 1 hour or more and 20 hours or less.

The polymerization temperature when a persulfate is used as the polymerization initiator is preferably 70° C. or higher, and more preferably 75° C. or higher from the viewpoint of reactivity, and is preferably 85° C. or lower, and more preferably 83° C. or lower from the viewpoint of the molecular weight distribution of the dispersant (B).

The polymerization atmosphere is preferably a nitrogen gas atmosphere or an inert gas atmosphere such as argon.

After completion of the polymerization reaction, the generated dispersant (B) can be isolated by a known method such as reprecipitation from the reaction solution and distillation of the solvent. Further, the dispersant (B) may be subjected to reprecipitation, membrane separation, chromatography, extraction, or the like, for removing unreacted monomers, or the like, therefrom.

From the viewpoint of improving the productivity of the pigment dispersion, the dispersant (B) is preferably used directly as a solution of the dispersant (B) without removing the solvent used in the polymerization reaction.

The acid value of the dispersant (B) is preferably 25 mgKOH/g or more, more preferably 30 mgKOH/g or more, still more preferably 50 mgKOH/g or more, and even more preferably 100 mgKOH/g or more from the viewpoint of reducing the dispersed particle diameter of the pigment and improving the normal temperature storage stability, further from the viewpoint of improving the high temperature storage stability, and from the viewpoint of improving the ejection property and the decap property, and from the same viewpoints as described above, the acid value is preferably 350 mgKOH/g or less, more preferably 300 mgKOH/g or less, still more preferably 270 mgKOH/g or less, even more preferably 230 mgKOH/g or less, yet still more preferably 200 mgKOH/g or less, yet even more preferably 150 mgKOH/g or less, and further more preferably 130 mgKOH/g or less. The acid value of the dispersant (B) can be measured by the method described in Examples.

The weight average molecular weight of the dispersant (B) in terms of polystyrene is preferably 5,000 or more, more preferably 20,000 or more, and still more preferably 40,000 or more from the viewpoint of improving the dispersion stability of the pigment dispersion and improving the normal temperature storage stability, further from the viewpoint of improving the high temperature storage stability, and from the viewpoint of improving the ejection property and the decap property, and is preferably 500,000 or less, more preferably 300,000 or less, still more preferably 150,000 or less, even more preferably 100,000 or less, and yet still more preferably 70,000 or less from the viewpoint of reducing the dispersed particle diameter of the pigment. The weight-average molecular weight of the dispersant (B) can be measured by the method described in Examples.

It is preferable that the dispersant (B) is ionized by neutralizing at least part of the anionic group. As a result, an electric repulsive force can be randomly imparted to the dispersant (B), and the anionic group of the dispersant (B) is hydrated in a water-based medium, thereby suppressing the formation of an intramolecular hydrogen bond and bringing about a state in which the polymer chain of the dispersant (B) is sufficiently expanded in the water-based medium without shrinkage. Therefore, it is considered that the anionic group of the dispersant (B) can more efficiently form an ionic bond with the aluminum of the aluminum lake pigment (A), the dispersed particle diameter of the pigment is further reduced, the normal temperature storage stability and the high temperature storage stability are further improved, and further, the ejection property and the decap property can be further improved. From this viewpoint, the degree of neutralization of the dispersant (B) is preferably 5 mol % or more, more preferably 7 mol % or more, and still more preferably 10 mol % or more, and is preferably 95 mol % or less, more preferably 90 mol % or less, still more preferably 70 mol % or less, even more preferably 50 mol % or less, yet still more preferably 42 mol % or less, yet even more preferably 40 mol % or less, further more preferably 35 mol % or less, still further more preferably 32 mol % or less, and even further more preferably 30 mol % or less.

Further, the degree of neutralization of the dispersant (B) is preferably 5 mol % or more, more preferably 7 mol % or more, and still more preferably 10 mol % or more from the viewpoint of reducing the dispersed particle diameter of the pigment and improving the normal temperature storage stability and further from the viewpoint of improving the high temperature storage stability, and is preferably 95 mol % or less, more preferably 90 mol % or less, still more preferably 70 mol % or less, even more preferably 50 mol % or less, yet still more preferably 42 mol % or less, and yet even more preferably 40 mol % or less from the same viewpoints as described above.

Furthermore, the degree of neutralization of the dispersant (B) is preferably 5 mol % or more, more preferably 7 mol % or more, and still more preferably 10 mol % or more from the viewpoint of further improving the ejection property and the decap property, and is preferably 95 mol % or less, more preferably 70 mol % or less, still more preferably 50 mol % or less, even more preferably 42 mol % or less, yet still more preferably 40 mol % or less, yet even more preferably 35 mol % or less, further more preferably 32 mol % or less, and still further more preferably 30 mol % or less from the same viewpoint as described above.

Examples of a neutralizing agent used for neutralization include ammonia; organic amines such as ethylamine, diethylamine, trimethylamine, triethylamine, and triethanolamine; and hydroxides of alkali metals such as lithium hydroxide, sodium hydroxide, and potassium hydroxide. Among these, from the viewpoint of reducing the dispersed particle diameter of the pigment and improving the normal temperature storage stability, further from the viewpoint of improving the high temperature storage stability, and from the viewpoint of improving the ejection property and the decap property, hydroxides of alkali metals are preferable, and sodium hydroxide is more preferable. These neutralizing agents may be used alone or in combination of two or more thereof.

The neutralizing agent is preferably used as an aqueous solution of a neutralizing agent.

(Production of Water-based Pigment Dispersion)

The method for producing the pigment dispersion of the present invention is not particularly limited, but a method of subjecting a pigment mixture containing the aluminum lake pigment (A), the dispersant (B), water, and if necessary, an additive to a dispersion treatment with a disperser is preferred from the viewpoint of reducing the dispersed particle diameter of the pigment and improving the normal temperature storage stability, further from the viewpoint of improving the high temperature storage stability, and from the viewpoint of improving the ejection property and the decap property.

The dispersion treatment of the pigment mixture may be performed by one time dispersion, and from the viewpoint of obtaining a uniform pigment dispersion, the dispersion treatment may be performed by performing preliminary dispersion and then further performing main dispersion with a disperser.

The disperser is not particularly limited, and examples thereof include kneading mixers such as a kneader; media-type dispersers such as an attritor, a ball mill, a sand mill using glass beads, zirconia beads, or the like, and a paint shaker; and colloid mills.

The temperature of the dispersion treatment is preferably maintained at 10° C. or higher and 35° C. or lower, more preferably 15° C. or higher and 30° C. or lower, and still more preferably 18° C. or higher and 27° C. or lower from the viewpoint of reducing the viscosity of the pigment dispersion.

The time of the dispersion treatment is preferably 2 hours or more and 200 hours or less, and more preferably 3 hours or more and 50 hours or less from the viewpoint of sufficiently micronizing the pigment.

The non-volatile component concentration (solid content concentration) of the pigment dispersion of the present invention is preferably 5% by mass or more, more preferably 8% by mass or more, and still more preferably 10% by mass or more from the viewpoint of reducing the dispersed particle diameter of the pigment and improving the normal temperature storage stability, further from the viewpoint of improving the high temperature storage stability, and from the viewpoint of improving the ejection property and the decap property, and is preferably 40% by mass or less, more preferably 30% by mass or less, still more preferably 25% by mass or less, even more preferably 20% by mass or less, yet still more preferably 15% by mass or less, and yet even more preferably 12% by mass or less from the same viewpoints as described above. The solid content concentration of the pigment dispersion is measured by the method described in Examples.

The content of the aluminum lake pigment (A) in the pigment dispersion of the present invention is preferably 3% by mass or more, more preferably 5% by mass or more, and still more preferably 10% by mass or more from the viewpoint of reducing the dispersed particle diameter of the pigment and improving the normal temperature storage stability of the pigment dispersion, further from the viewpoint of improving the high temperature storage stability, and from the viewpoint of facilitating the preparation of the water-based ink and improving the ejection property and the decap property, and is preferably 20% by mass or less, more preferably 17% by mass or less, and still more preferably 15% by mass or less from the same viewpoints as described above.

The content of the pigment dispersant (B) in the pigment dispersion of the present invention is preferably 1% by mass or more, more preferably 2% by mass or more, and still more preferably 3% by mass or more from the viewpoint of reducing the dispersed particle diameter of the pigment and improving the normal temperature storage stability of the pigment dispersion, further from the viewpoint of improving the high temperature storage stability, and from the viewpoint of improving the ejection property and the decap property, and is preferably 20% by mass or less, more preferably 15% by mass or less, and still more preferably 10% by mass or less from the same viewpoints as described above.

The mass ratio of the content of the aluminum lake pigment (A) to the total content of the aluminum lake pigment (A) and the pigment dispersant (B), [{aluminum lake pigment (A)}/{aluminum lake pigment (A)+pigment dispersant (B)}], in the pigment dispersion of the present invention is preferably 0.10 or more, more preferably 0.20 or more, still more preferably 0.30 or more, even more preferably 0.40 or more, yet still more preferably 0.45 or more, yet even more preferably 0.50 or more, further more preferably 0.55 or more, and still further more preferably 0.60 or more from the viewpoint of reducing the dispersed particle diameter of the pigment and improving the normal temperature storage stability of the pigment dispersion, further from the viewpoint of improving the high temperature storage stability, and from the viewpoint of facilitating the preparation of the water-based ink, and improving the ejection property and the decap property, and it is preferably 0.90 or less, more preferably 0.85 or less, still more preferably 0.80 or less, even more preferably 0.75 or less, and yet still more preferably 0.70 or less from the same viewpoints as described above.

Further, the mass ratio [{aluminum lake pigment (A)}/{aluminum lake pigment (A)+pigment dispersant (B)}] is preferably 0.10 or more, more preferably 0.20 or more, still more preferably 0.30 or more, even more preferably 0.40 or more, yet still more preferably 0.45 or more, yet even more preferably 0.50 or more, further more preferably 0.55 or more, and still further more preferably 0.60 or more from the viewpoint of reducing the dispersed particle diameter of the pigment and improving the normal temperature storage stability, and further from the viewpoint of improving the high temperature storage stability, and it is preferably 0.90 or less, more preferably 0.85 or less, still more preferably 0.80 or less, even more preferably 0.75 or less, and yet still more preferably 0.70 or less from the same viewpoints as described above.

Furthermore, the mass ratio [{aluminum lake pigment (A)}/{aluminum lake pigment (A)+pigment dispersant (B)}] is preferably 0.10 or more, more preferably 0.20 or more, still more preferably 0.30 or more, even more preferably 0.40 or more, yet still more preferably 0.45 or more, yet even more preferably 0.50 or more, further more preferably 0.55 or more, and still further more preferably 0.60 or more from the viewpoint of further improving the ejection property and the decap property, and it is preferably 0.90 or less, and more preferably 0.85 or less from the same viewpoint as described above.

The content of water in the pigment dispersion of the present invention is preferably 50% by mass or more, more preferably 60% by mass or more, still more preferably 70% by mass or more, and even more preferably 75% by mass or more from the viewpoint of the dispersion stability of the pigment dispersion, and it is preferably 95% by mass or less, more preferably 90% by mass or less, and still more preferably 85% by mass or less from the same viewpoint as described above.

(Properties of Water-based Pigment Dispersion)

The volume average particle diameter of the pigment dispersion of the present invention is preferably 200 nm or less, more preferably 170 nm or less, still more preferably 150 nm or less, and even more preferably 140 nm or less from the viewpoints of reducing the dispersed particle diameter of the pigment and improving the normal temperature storage stability of the pigment dispersion, further from the viewpoint of improving the high temperature storage stability, and from the viewpoint of improving the ejection property and the decap property, and is preferably 50 nm or more, more preferably 70 nm or more, still more preferably 90 nm or more, and even more preferably 110 nm or more from the viewpoint of the productivity of the pigment dispersion. The volume average particle diameter of the pigment dispersion is measured by the method described in Examples.

The viscosity at 20° C. of the pigment dispersion of the present invention is preferably 1 mPa·s or more, more preferably 1.5 mPa·s or more, still more preferably 2 mPa·s or more, even more preferably 2.5 mPa·s or more, yet still more preferably 3 mPa·s or more, yet even more preferably 3.5 mPa·s or more, and further more preferably 4 mPa·s or more from the viewpoint of facilitating blending into a water-based ink and improving the ejection property and the decap property of the water-based ink, and is preferably 20 mPa·s or less, more preferably 15 mPa·s or less, still more preferably 10 mPa·s or less, even more preferably 7 mPa·s or less, and yet still more preferably 6 mPa·s or less from the same viewpoint as described above. The viscosity at 20° C. of the pigment dispersion is measured by the method described in Examples.

The pH at 20° C. of the pigment dispersion of the present invention is preferably 4 or more, more preferably 4.5 or more, and still more preferably 5 or more from the viewpoint of the dispersion stability of the pigment dispersion, and is preferably 9 or less, more preferably 8 or less, still more preferably 7.5 or less, and even more preferably 7 or less from the viewpoint of the ejection property. The pH at 20° C. of the pigment dispersion is measured by the method described in Examples.

Since the pigment dispersion of the present invention contains the pigment (A) in the form of an aluminum lake, it is preferably used in the food field, the medical field, the cosmetic field and the like from the viewpoint of safety. Above all, the pigment dispersion of the present invention is preferably used in the cosmetic field.

When the pigment dispersion of the present invention is used in the cosmetic field, the pigment dispersion is preferably used as a cosmetic composition in a water-based ink to be applied to hair, skin (including lips) or nails, and more preferably used in a water-based ink to be applied to hair.

Examples of the cosmetic composition include a hair cosmetic composition, a skin cosmetic composition, and a nail cosmetic composition. Among these, the cosmetic composition is preferably used as a hair cosmetic composition.

The hair cosmetic composition is preferably applied to a hair dye such as hair mascara and hair color; a styling agent such as hair wax, hair spray, hair mousse, and hair foam; and a hair restorer.

The skin cosmetic composition is preferably applied to base makeup cosmetics such as makeup base cosmetics, foundations, and concealers; point makeup cosmetics such as blushes, eye shadows, mascaras, eyeliners, eyebrow cosmetics, overcoating agents, and lipsticks; ultraviolet protection cosmetics such as sunburn preventive emulsions, and sunscreen creams; skin cleansing cosmetics such as facial cleansers, and cleansing cosmetics; basic cosmetics such as beauty liquids, packs, and massage cosmetics; and the like.

The nail cosmetic composition is preferably applied to manicure cosmetics such as nail enamel and nail gloss.

In addition, when the pigment dispersion of the present invention is used in the cosmetic field, the pigment dispersion can be used in a water-based ink used for printing to decorate the surfaces of packaging container containing a cosmetic. Examples of the packaging container include various compact cases containing powder cosmetics such as foundation, eye shadow, cheek, and eyebrow.

The pigment dispersion of the present invention is preferably used for ink-jet recording because the dispersed particle diameter of the pigment is reduced, the normal temperature storage stability and the high temperature storage stability are excellent, and the ejection property and the decap property can be improved when the pigment dispersion is used for an ink-jet recording system.

[Water-Based Ink for Ink-Jet Recording]

The water-based ink for ink-jet recording of the present invention (hereinafter, also simply referred to as "water-based ink") preferably contains the water-based pigment dispersion and a water-soluble organic solvent (C) from the viewpoint of improving the ejection property and the decap property.

<Water-Soluble Organic Solvent (C)>

The water-soluble organic solvent (C) (hereinafter, also simply referred to as an "organic solvent (C)") preferably contains at least one kind of water-soluble organic solvents having a boiling point of 90° C. or higher from the viewpoint of suppressing an increase in viscosity due to a pigment dispersant and improving the ejection property and the decap property.

In the present invention, the "water-soluble organic solvent" is an organic solvent arbitrarily miscible with water.

The boiling point of the organic solvent (C) is preferably 100° C. or higher, more preferably 150° C. or higher, still more preferably 200° C. or higher, even more preferably 230° C. or higher, yet still more preferably 250° C. or higher, yet even more preferably 280° C. or higher, and further more preferably 290° C. or higher, and is preferably 400° C. or lower, more preferably 370° C. or lower, still more preferably 350° C. or lower, even more preferably 330° C. or lower, and yet still more preferably 320° C. or lower, from the viewpoint of suppressing drying of the ink in the ink-jet nozzle and improving the ejection property and the decap property.

When two or more kinds of water-soluble organic solvents are used as the organic solvent (C), the boiling point of the organic solvent (C) is a weighted average value weighted by the content (% by mass) of each water-soluble organic solvent.

Examples of the organic solvent (C) include polyhydric alcohols, polyhydric alcohol alkyl ethers, nitrogen-containing heterocyclic compounds, amides, amines, and sulfur-containing compounds.

In addition, a plurality of polyhydric alcohols included in the concept of polyhydric alcohols can be mixed and used, and a plurality of polyhydric alcohol alkyl ethers are also preferably mixed and used.

Examples of the polyhydric alcohol include ethylene glycol (boiling point: 197° C.), diethylene glycol (boiling point: 244° C.), polyethylene glycol, propylene glycol (boiling point: 188° C.), dipropylene glycol (boiling point: 232° C.), polypropylene glycol, 1,3-propanediol (boiling point: 210° C.), 1,3-butanediol (boiling point: 208° C.), 1,4-butanediol (boiling point: 230° C.), 3-methyl-1,3-butanediol (boiling point: 203° C.), 1,5-pentanediol (boiling point: 242° C.), 1,2-hexanediol (boiling point: 223° C.), 1,6-hexanediol (boiling point: 250° C.), 2-methyl-2,4-pentanediol (boiling point: 196° C.), 1,2,6-hexanetriol (boiling point: 178° C.), 1,2,4-butanetriol (boiling point: 190° C.), 1,2,3-butanetriol (boiling point: 175° C.), and petriol (boiling point: 216° C.). In addition, it is preferable to use a compound having a boiling point of 250° C. or higher, such as triethylene glycol (boiling point: 285° C.), tripropylene glycol (boiling point: 273° C.), or glycerin (boiling point: 290° C.), in combination with a compound having a boiling point of lower than 250° C.

As the polyhydric alcohol, an alkylene oxide adduct of the polyhydric alcohol may be used. As the alkylene oxide adduct of the polyhydric alcohol, for example, a glycerin-modified ethylene oxide adduct is preferably exemplified.

Examples of the polyhydric alcohol alkyl ether include ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 202° C.), diethylene glycol monobutyl ether (boiling point: 230° C.), triethylene glycol monomethyl ether (boiling point: 122° C.), triethylene glycol monoisobutyl ether (boiling point: 160° C.), tetraethylene glycol monomethyl ether (boiling point: 158° C.), propylene glycol monoethyl ether (boiling point: 133° C.), dipropylene glycol monobutyl ether (boiling point: 227° C.), dipropylene glycol monomethyl ether (boiling point: 90° C.), tripropylene glycol monomethyl ether (boiling point: 100° C.), and tripropylene glycol monobutyl ether. In addition, it is preferable to use a compound having a boiling point of 250° C. or higher, such as triethylene glycol monobutyl ether (boiling point: 276° C.), in combination with a compound having a boiling point of lower than 250° C.

Examples of the nitrogen-containing heterocyclic compound include N-methyl-2-pyrrolidone (boiling point: 202° C.), 2-pyrrolidone (boiling point: 245° C.), 1,3-dimethyl-2-imidazolidinone (boiling point: 220° C.), and e-caprolactam (boiling point: 136° C.).

Examples of the amide include formaldehyde (boiling point: 210° C.), N-methylformamide (boiling point: 199° C.), and N,N-dimethylformamide (boiling point: 153° C.).

Examples of the amine include monoethanolamine (boiling point: 170° C.), diethanolamine (boiling point: 217° C.), triethanolamine (boiling point: 208° C.), and triethylamine (boiling point: 90° C.).

Examples of the sulfur containing compound include dimethylsulfoxide (boiling point: 189° C.). In addition, it is preferable to use a compound having a boiling point of 250° C. or higher, such as sulfolane (boiling point: 285° C.) and thiodiglycol (boiling point: 282° C.), in combination with a compound having a boiling point of lower than 250° C.

Among these, one or more selected from the group consisting of polyhydric alcohols and polyhydric alcohol alkyl ethers are preferable, one or more selected from the group consisting of polyhydric alcohols and polyhydric alcohol-modified alkylene oxide adducts are more preferable, and one or more selected from the group consisting of glycerin, 1,2-hexanediol, and glycerin-modified ethylene oxide adducts are still more preferable.

(Other Components)

In addition to the aluminum lake pigment (A), the dispersant (B), and the water-soluble organic solvent (C), various additives such as a surfactant, a wetting agent, a penetrant, a dispersant other than the dispersant (B), a viscosity modifier, a defoaming agent, an antifungal agent, a rust inhibitor, and an ultraviolet absorber, which are generally used can be added to the water-based ink of the present invention.

The water-based ink of the present invention may further contain a surfactant from the viewpoint of printing quality.

The surfactant is preferably a nonionic surfactant from the viewpoint of printing quality, and examples thereof include (1) alkyl ethers, alkenyl ethers, alkynyl ethers, or aryl ethers of polyoxyalkylenes obtained by adding ethylene oxide, propylene oxide, or butylene oxide to saturated or unsaturated, linear or branched higher alcohols having 8 or more and 22 or less carbon atoms, polyhydric alcohols, or aromatic alcohols, (2) esters of higher alcohols having a saturated or unsaturated, linear or branched hydrocarbon group having 8 or more and 22 or less carbon atoms and polyhydric fatty acids, (3) polyoxyalkylene aliphatic amines having a linear or branched alkyl group or alkenyl group having 8 or more and 20 or less carbon atoms, (4) ester compounds of higher fatty acids having 8 or more and 22 or less carbon atoms and polyhydric alcohols, or compounds obtained by adding ethylene oxide, propylene oxide, or butylene oxide to the ester compounds of polyhydric alcohols, (5) silicone-based surfactants, and (6) acetylene glycol-based surfactants.

Among these, the nonionic surfactant is preferably an acetylene glycol-based surfactant. Specific examples thereof include one or more selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-dodecyne-5,8-diol, 3,5-dimethyl-1-hexyne-3-ol, and ethylene oxide adducts thereof. Among these, the nonionic surfactant is more preferably one or more selected from the group consisting of 2,4,7,9-tetramethyl-5-decyne-4,7-diol, 3,6-dimethyl-4-octyne-3,6-diol, 2,5-dimethyl-3-hexyne-2,5-diol, and ethylene oxide adducts thereof, and still more preferably one or more selected from the group consisting of 2,4,7,9-tetramethyl-5-decyne-4,7-diol, and ethylene oxide adducts thereof.

Examples of commercially available products of the nonionic surfactant include SURFYNOL series manufactured by Nissin Chemical Industry Co., Ltd. and Air Products & Chemicals, Inc.; ACETYLENOL series manufactured by Kawaken Fine Chemicals Co., Ltd.; and "EMULGEN 120 (polyoxyethylene lauryl ether)" manufactured by Kao Corporation.

(Production of Water-Based Ink for Ink-Jet Recording)

The water-based ink of the present invention is preferably produced by mixing the water-based pigment dispersion, the water-soluble organic solvent (C), and, if necessary, water and various additives. In addition, filtration with a filter or the like may be further performed.

The content of each component in the water-based ink of the present invention and the ink properties are as follows.

(Content of Aluminum Lake Pigment (A))

The content of the aluminum lake pigment (A) in the water-based ink of the present invention is preferably 1% by mass or more, more preferably 2% by mass or more, and still more preferably 3% by mass or more from the viewpoint of coloring degree, and is preferably 20% by mass or less, more preferably 15% by mass or less, still more preferably 10% by mass or less, even more preferably 7% by mass or less, and yet still more preferably 5% by mass or less from the viewpoint of improving the ejection property and the decap property.

(Content of Pigment Dispersant (B))

The content of the dispersant (B) in the water-based ink of the present invention is preferably 0.3% by mass or more, more preferably 0.5% by mass or more, and still more preferably 0.6% by mass or more from the viewpoint of improving the dispersion stability of the water-based ink and improving the ejection property and the decap property, and is preferably 10% by mass or less, more preferably 8% by mass or less, still more preferably 5% by mass or less, even more preferably 3% by mass or less, and yet still more preferably 2.5% by mass or less from the same viewpoint as described above.

The mass ratio of the content of the aluminum lake pigment (A) to the total content of the aluminum lake pigment (A) and the pigment dispersant (B), [{aluminum lake pigment (A)}/{aluminum lake pigment (A)+pigment dispersant (B)}], in the water-based ink of the present invention is preferably 0.10 or more, more preferably 0.20 or more, still more preferably 0.30 or more, even more preferably 0.40 or more, yet still more preferably 0.50 or more, and yet even more preferably 0.60 or more from the viewpoint of improving the dispersion stability of the water-based ink and improving the ejection property and the decap property, and is preferably 0.90 or less, more preferably 0.85 or less, still more preferably 0.80 or less, even more preferably 0.75 or less, and yet still more preferably 0.70 or less from the same viewpoint as described above.

(Content of Water-Soluble Organic Solvent (C))

The content of the water-soluble organic solvent (C) in the water-based ink of the present invention is preferably 5% by mass or more, more preferably 10% by mass or more, and still more preferably 15% by mass or more from the viewpoint of improving the ejection property and the decap property, and is preferably 35% by mass or less, more preferably 30% by mass or less, and still more preferably 25% by mass or less from the same viewpoint as described above.

(Content of Water)

The content of water in the water-based ink of the present invention is preferably 40% by mass or more, more preferably 50% by mass or more, still more preferably 60% by mass or more, and even more preferably 70% by mass or more from the viewpoint of improving the ejection property and the decap property, and is preferably 90% by mass or less, and more preferably 85% by mass or less from the same viewpoint as described above.

(Content of Surfactant)

When the water-based ink of the present invention contains a surfactant, the content of the surfactant in the water-based ink is preferably 0.01% by mass or more, more preferably 0.03% by mass or more, still more preferably 0.05% by mass or more, and even more preferably 0.07% by mass or more from the viewpoint of dot diameter, and is preferably 5% by mass or less, more preferably 3% by mass or less, still more preferably 1% by mass or less, and even more preferably 0.5% by mass or less from the same viewpoint as described above.

(Properties of Water-Based Ink)

The volume-average particle diameter of the water-based ink of the present invention is preferably 200 nm or less, more preferably 170 nm or less, still more preferably 150 nm or less, and even more preferably 140 nm or less from the viewpoint of improving the ejection property and the decap property, and is preferably 50 nm or more, more preferably 70 nm or more, still more preferably 90 nm or more, and even more preferably 110 nm or more from the viewpoint of the productivity of the water-based ink. The volume average particle diameter of the water-based ink is measured by the method described in Examples.

The viscosity at 20° C. of the water-based ink of the present invention is preferably 1.0 mPa·s or more, more preferably 1.5 mPa·s or more, still more preferably 2.0 mPa·s or more, even more preferably 2.5 mPa·s or more, yet still more preferably 3.0 mPa·s or more, and yet even more preferably 3.5 mPa·s or more from the viewpoint of improving the ejection property and the decap property, and is preferably 12 mPa·s or less, more preferably 9.0 mPa·s or less, still more preferably 7.0 mPa·s or less, even more preferably 5.5 mPa·s or less, and yet still more preferably 4.5 mPa·s or less from the same viewpoint as described above. The viscosity at 20° C. of the water-based ink is measured by the method described in Examples.

The pH at 20° C. of the water-based ink of the present invention is preferably 4 or more, more preferably 4.5 or more, and still more preferably 5 or more from the viewpoint of the dispersion stability of the water-based ink, and is preferably 9 or less, more preferably 8 or less, still more preferably 7.5 or less, and even more preferably 7 or less from the viewpoint of the ejection property. The pH at 20° C. of the water-based ink is measured by the method described in Examples.

(Ink-Jet Recording Method)

An ink-jet recording method using the water-based ink of the present invention is a method of recording by ejecting the water-based ink onto a recording medium, preferably using an ink-jet recording apparatus.

Since the aluminum lake pigment (A) according to the present invention is a pigment having a relatively low specific gravity, an ink-jet recording apparatus having no dispersing unit may be used, but it is preferable to use an ink-jet recording apparatus having a dispersing unit for dispersing the aluminum lake pigment (A) in the water-based ink.

In a case where the ink-jet recording apparatus includes a dispersing unit, the ink-jet recording method preferably includes a step 1 of redispersing the water-based ink with the dispersing unit and a step 2 of ejecting the water-based ink redispersed in the step 1 to perform recording on a recording medium.

By using the water-based ink in the ink-jet recording method, even when the aluminum lake pigment (A) dispersed in the water-based ink settles or flocculates during printing or after suspension of printing, the dispersing unit of the ink-jet recording apparatus can easily redisperse the aluminum lake pigment (A) to improve the ejection property and the decap property. From this viewpoint, the ink-jet recording apparatus preferably includes at least an ink ejection unit, a container (ink filling container) for filling the water-based ink, an ink channel, and a dispersing unit for dispersing the aluminum lake pigment (A) contained in the water-based ink. In addition, the ink filling container may further include an ink preliminary filling container.

As the ink ejection unit, there is a method of ejecting ink using a thermal type or piezoelectric type ink-jet ejection head, but from the viewpoint of the ejection property and the decap property, a thermal type is preferable. That is, in the ink-jet recording method of the present invention, a method is preferable in which the water-based ink is used for a thermal type, a container filled with the water-based ink is mounted on an ink-jet recording apparatus, and the water-based ink is ejected using a thermal type ejection head to perform recording on a recording medium.

The dispersing unit is not particularly limited as long as it is a unit for dispersing the aluminum lake pigment (A) in the water-based medium of the water-based ink by a mechanical force.

The recording medium is not particularly limited, and examples thereof include recording media used in printing in the food field, the medical field, the cosmetic field, and the like. Examples thereof include highly water-absorbent recording media such as plain paper and high-quality paper; low water-absorbent recording media such as art paper, coated paper, and synthetic resin films; and metals.

When the water-based ink of the present invention is used as a cosmetic composition, hair, skin (including lips), or nails can also be used as a recording medium. Preferred embodiments of the cosmetic composition that can be used are as exemplified for the pigment dispersion described above.

Furthermore, when the water-based ink of the present invention is used as a water-based ink for use in printing for decorating the surfaces of packaging container containing a cosmetic, examples of the recording media include, as described above, various packaging container of various compact cases containing powder cosmetics such as foundation, eye shadow, cheek, and eyebrow.

Examples

In the following Production Examples, Examples, and Comparative Examples, "part(s)" and "%" are "part(s) by mass" and "% by mass", respectively, unless otherwise specified.

Various properties were measured by the following methods.

(1) Measurement of Acid Value of Pigment Dispersant (B)

The acid value was measured in accordance with the potentiometric titration method of JIS K 0070.

(2) Measurement of Weight-Average Molecular Weight of Pigment Dispersant (B)

The weight-average molecular weight was measured by gel permeation chromatography [GPC apparatus (HLC-8320GPC) manufactured by Tosoh Corporation, column (PW+G4000PW+G2500PW) manufactured by Tosoh Corporation, flow rate: 1.0 mL/min, temperature: 40° C.] using a solution of 0.2M phosphate buffer/acetonitrile=9/1 (volume ratio) as an eluent and polyethylene glycol having a predetermined monodispersed weight-average molecular weight as a standard substance.

(3) Measurement of Solid Content Concentration 10.0 g of sodium sulfate, which had been made constant in a desiccator, was weighed in a 30 mL polypropylene container (φ=40 mm, height=30 mm), about 1.0 g of a sample was added thereto, and after mixing, the mixture was accurately weighed, maintained at 105° C. for 2 hours to remove a volatile component, and then left in the desiccator for 15 minutes to measure the mass. The mass of the sample after the removal of the volatile component was defined as a solid content, and was divided by the mass of the sample added to obtain a solid content concentration (%).

(4) Measurement of Volume Average Particle Diameter of Water-Based Pigment Dispersion or Water-Based Ink The volume average particle diameter of the water-based pigment dispersion or the water-based ink was measured using a zeta potential/particle size measurement system "ELS-8000" (manufactured by Otsuka Electronics Co., Ltd.) by placing a dispersion liquid diluted with water so as to have a concentration of about $5\times10^{-3}$% in a measurement cell, setting the temperature to 25° C. and the number of integrations to 100, and inputting the refractive index of water (1.333) as the refractive index of the dispersion medium.

(5) pH of Water-Based Pigment Dispersion or Water-Based Ink

The pH of the water-based pigment dispersion or the ink at 20° C. was measured using a desktop pH meter "F-71" (manufactured by Horiba, Ltd.) using a pH electrode "6337-10D" (manufactured by Horiba, Ltd.).

(6) Viscosity of Water-Based Pigment Dispersion or Water-Based Ink

The viscosity was measured at 20° C. using an E-type viscometer "TV-25" (manufactured by Toki Sangyo Co., Ltd., standard cone rotor 1° 34'×R24, rotation speed: 50 rpm).

Production Example 1 (Production of Solution of Pigment Dispersant (B-1))

233 g of water was charged into a 2 L glass reaction container equipped with a dropping funnel, and the temperature was raised to 80° C. under a nitrogen atmosphere.

Next, under a nitrogen gas atmosphere, three solutions of a monomer solution of 17.3 g of methacrylic acid and 82.7 g of methoxypolyethylene glycol monomethacrylate (ethylene oxide (EO) average addition mole number n=2, trade name "NK Ester M-20G", manufactured by Shin-Nakamura Chemical Co., Ltd.) as a dropping solution 1, 13.5 g of a 2-mercaptoethanol aqueous solution having a concentration of 7% as a dropping solution 2, and 16 g of an ammonium persulfate aqueous solution having a concentration of 6% as a dropping solution 3 were gradually added dropwise to the reaction container over 90 minutes at the same time.

Next, 5.5 g of an ammonium persulfate aqueous solution having a concentration of 6% was gradually added dropwise to the reaction container over 30 minutes, and after completion of the dropwise addition, the mixed solution was aged at 80° C. for 1 hour. Thereafter, the mixed solution was cooled to 40° C., 1.68 g of a sodium hydroxide aqueous solution having a concentration of 48% (amount of sodium hydroxide: 806 mg) was added to neutralize the solution, and water was added so that the solid content concentration became 20%, thereby obtaining a solution of pigment dispersant (B-1).

Production Examples 2 to 15 (Production of Solutions of Pigment Dispersants (B-2) to (B-15))

Solutions of pigment dispersants (B-2) to (B-15) were obtained in the same manner as in Production Example 1 except that the monomer composition and the amount of sodium hydroxide were changed to those shown in Table 1.

The details of the monomers in Table 1 are as follows.

MPEGMAA (n=2): methoxypolyethylene glycol monomethacrylate (E0 average addition mole number=2, "NK Ester M-20G" manufactured by Shin-Nakamura Chemical Co., Ltd.)

MPEGMAA (n=4): methoxypolyethylene glycol monomethacrylate (E0 average addition mole number=4, "NK Ester M-40G" manufactured by Shin-Nakamura Chemical Co., Ltd.)

MPEGMAA (n=9): methoxypolyethylene glycol monomethacrylate (E0 average addition mole number=9, "NK Ester M-90G" manufactured by Shin-Nakamura Chemical Co., Ltd.)

MPEGMAA (n=23): methoxypolyethylene glycol monomethacrylate (E0 average addition mole number=23, "NK Ester M-230G" manufactured by Shin-Nakamura Chemical Co., Ltd.)

MPEGMAA (n=45): methoxypolyethylene glycol monomethacrylate (E0 average addition mole number=45, "NK Ester M-450G" manufactured by Shin-Nakamura Chemical Co., Ltd.)

MPEGMAA (n=90): methoxypolyethylene glycol monomethacrylate (E0 average addition mole number=90, "NK Ester M-900G" manufactured by Shin-Nakamura Chemical Co., Ltd.)

MPEGMAA (n=120): methoxypolyethylene glycol monomethacrylate (E0 average addition mole number=120, one produced in the following Production Example M1 was used.)

50POEP-800B (n=14): octoxy(polyethylene glycol/polypropylene glycol) methacrylate (block type) (E0 average addition mole number=8, propylene oxide (PO) average addition mole number=6, "BLEMMER 50POEP-800B" manufactured by NOF CORPORATION)

Production Example M1 (Production of Methoxypolyethylene Glycol Monomethacrylate (n=120))

The target methoxypolyethylene glycol monomethacrylate (E0 average addition mole number=120) was obtained by the method described in (Step 1) of Example 1 of JPH11-228636 A using polyethylene glycol monomethyl ether (weight-average molecular weight: 5,312) having an E0 average addition mole number of 120, which was melted at 80° C.

TABLE 1

| | | | Production Example 1 | 2 | 3 | 4 | 5 | 6 | 7 | 8 |
|---|---|---|---|---|---|---|---|---|---|---|
| Pigment dispersant (B) number | | | B-1 | B-2 | B-3 | B-4 | B-5 | B-6 | B-7 | B-8 |
| Monomer composition (%) | Anionic group-containing monomer (b-1) | Methacrylic acid | 17.3 | 17.3 | 17.3 | 17.3 | 17.3 | 17.3 | 17.3 | 17.3 |
| | | Acrylic acid | | | | | | | | |
| | Hydrophilic nonionic monomer (b-2) | MPEGMAA (n = 2) | 82.7 | | | | | | | |
| | | MPEGMAA (n = 4) | | 82.7 | | | | | | |
| | | MPEGMAA (n = 9) | | | 82.7 | | | | | |
| | | MPEGMAA (n = 23) | | | | 82.7 | | | | |
| | | MPEGMAA (n = 45) | | | | | 82.7 | | | |
| | | MPEGMAA (n = 90) | | | | | | 82.7 | | |
| | | MPEGMAA (n = 120) | | | | | | | 82.7 | |
| | | 50POEP-800B (n = 14) | | | | | | | | 82.7 |
| Properties of pigment dispersant (B) | Acid value (mgKOH/g) | | 113 | 113 | 113 | 113 | 113 | 113 | 113 | 113 |
| | Weight-average molecular weight | | 51000 | 48000 | 54000 | 51000 | 53000 | 52000 | 50000 | 48000 |
| Added NaOH amount (mg) | | | 806 | 806 | 806 | 806 | 806 | 806 | 806 | 806 |
| Degree of neutralization (mol %) | | | 10 | 10 | 10 | 10 | 10 | 10 | 10 | 10 |
| Solid content concentration (%) of pigment dispersant (B) solution | | | 20 | 20 | 20 | 20 | 20 | 20 | 20 | 20 |

| | | | Production Example 9 | 10 | 11 | 12 | 13 | 14 | 15 |
|---|---|---|---|---|---|---|---|---|---|
| Pigment dispersant (B) number | | | B-9 | B-10 | B-11 | B-12 | B-13 | B-14 | B-15 |
| Monomer composition (%) | Anionic group-containing monomer (b-1) | Methacrylic acid | 4 | 10 | 30 | 40 | 50 | 7.9 | |
| | | Acrylic acid | | | | | | 7.9 | 14.5 |
| | Hydrophilic nonionic monomer (b-2) | MPEGMAA (n = 2) | | | | | | | |
| | | MPEGMAA (n = 4) | | | | | | | |
| | | MPEGMAA (n = 9) | | | | | | | |
| | | MPEGMAA (n = 23) | 96 | 90 | 70 | 60 | 50 | 84.2 | 85.5 |
| | | MPEGMAA (n = 45) | | | | | | | |
| | | MPEGMAA (n = 90) | | | | | | | |
| | | MPEGMAA (n = 120) | | | | | | | |
| | | 50POEP-800B (n = 14) | | | | | | | |
| Properties of pigment dispersant (B) | Acid value (mgKOH/g) | | 26 | 65 | 196 | 261 | 326 | 113 | 113 |
| | Weight-average molecular weight | | 44000 | 49000 | 55000 | 54000 | 50000 | 53000 | 54000 |
| Added NaOH amount (mg) | | | 185 | 463 | 1398 | 1861 | 2324 | 806 | 806 |

TABLE 1-continued

| | | | | | | | |
|---|---|---|---|---|---|---|---|
| Degree of neutralization (mol %) | 10 | 10 | 10 | 10 | 10 | 10 | 10 |
| Solid content concentration (%) of pigment dispersant (B) solution | 20 | 20 | 20 | 20 | 20 | 20 | 20 |

Comparative Production Examples C1 and C2

The following 25% polyacrylic acid aqueous solution or 35% sodium polyacrylate and water were mixed at the ratios shown in Table 2 to obtain solutions of pigment dispersants (B-C1) and (B-C2) having a solid content concentration of 20%.

25% polyacrylic acid aqueous solution (unneutralized polyacrylic acid, FUJIFILM Wako Pure Chemical Corporation, weight-average molecular weight: 50,000)

35% sodium polyacrylate aqueous solution (100 mol % neutralized sodium polyacrylate, FUJIFILM Wako Pure Chemical Corporation, weight-average molecular weight: 60,000)

TABLE 2

| | | Comparative Production Example | |
|---|---|---|---|
| | | C1 | C2 |
| Pigment dispersant (B') number | | B-C1 | B-C2 |
| Blending amount (parts) | 25% Polyacrylic acid aqueous solution | 224 | 0 |
| | 35% Sodium polyacrylate aqueous solution | 40 | 200 |
| | Water | 86 | 150 |
| Mass ratio [(polyacrylic acid)/(sodium polyacrylate)] | | 80/20 | 0/100 |
| Degree of neutralization (mol %) | | 20 | 100 |
| Solid content concentration (%) of pigment dispersant (B') solution | | 20 | 20 |

Example 1-1 (Water-Based Pigment Dispersion P-1)

In a 250 mL polypropylene bottle, 35 parts of the solution of the pigment dispersant (B-1) (solid content concentration: 20%) obtained in Production Example 1 (7 parts of the pigment dispersant B-1 effective component), 13 parts of an aluminum lake pigment A-1 ["BC Yellow No. 4 AL" (Yellow No. 4 Aluminum Lake, manufactured by Kishi Kasei Co., Ltd.)], and 52 parts of water were added, 200 g of zirconia beads having a diameter of 50 μm were added, and the mixture was dispersed for 15 hours at 25° C. using a paint shaker. The zirconia beads were removed using a mesh having an aperture of 75 μm, and the solid content concentration was adjusted with water to obtain a water-based pigment dispersion P-1 (solid content concentration: 20%).

Examples 1-2 to 1-15 and Comparative Examples 1-C1 and 1-C2 (Water-Based Pigment Dispersions P-2 to P-15 and P-C1 and P-C2)

Water-based pigment dispersions P-2 to P-15 and P-C1 and P-C2 (solid content concentration: 20%) were obtained in the same manner as in Example 1-1 except that the solution was changed to the solution of the pigment dispersant (B) shown in Table 3. The following evaluations were performed using the obtained water-based pigment dispersion.

[Evaluations]

<Effect of Reducing Dispersed Particle Diameter of Pigment>

(Volume Average Particle Diameter)

The volume average particle diameter of each of the water-based pigment dispersions of Examples 1-1 to 1-15 and Comparative Examples 1-C1 and 1-C2 was measured. The results are shown in Table 3. As the volume average particle diameter is smaller, the effect of reducing the dispersed particle diameter of the pigment is higher, and in a case where the volume average particle diameter is 200 nm or less, the effect of reducing the dispersed particle diameter of the pigment is excellent.

(Viscosity)

The viscosity of each of the water-based pigment dispersions of Examples 1-1 to 1-15 and Comparative Examples 1-C1 and 1-C2 was measured. The results are shown in Table 3.

The viscosities of the water-based pigment dispersions P-1 to P-15 of Examples were all 20 mPa·s or less, and when the water-based pigment dispersions were filtered using a cellulose acetate-made syringe filter having a pore size of 5 μm, a reduction in filtration rate due to pressure loss did not occur. Also in this respect, it is found that the dispersed particle diameter of the pigment is reduced.

On the other hand, the water-based pigment dispersions P-C1 and P-C2 of Comparative Examples had high viscosity, and when filtration by the same method as described above was attempted, it was difficult to pass the liquid due to pressure loss.

<Evaluation of Normal Temperature Storage Stability>

Each of the water-based pigment dispersions of Examples 1-1 to 1-15 and Comparative Examples 1-C1 and 1-C2 was allowed to stand at normal temperature (25° C.), the presence or absence of sediment was visually checked, and the normal temperature storage stability was evaluated according to the following evaluation criteria. The results are shown in Table 3.

A: No sediment was generated even after the dispersion was allowed to stand at normal temperature for 1 week.

A-: The generation of sediment was found 24 hours after the start of standing at normal temperature, but the generation of a transparent supernatant layer was not found after the dispersion was allowed to stand at normal temperature for 1 week.

B: The generation of sediment was found 24 hours after the start of standing at normal temperature, and the generation of a transparent supernatant layer was found after the dispersion was allowed to stand at normal temperature for 1 week.

<Evaluation of High Temperature Storage Stability>

Each of the water-based pigment dispersions of Examples 1-1 to 1-15 and Comparative Examples 1-C1 and 1-C2 was sealed in a glass screw tube and allowed to stand in a thermostatic bath at 60° C. for 4 weeks. Then, the volume-average particle diameter and the viscosity were measured, and a particle diameter retention rate (%) and a viscosity retention rate (%) were determined by the following equations. The results are shown in Table 3. As both the particle diameter retention rate (%) and the viscosity retention rate (%) are closer to 100%, the high temperature storage stability is more excellent.

Particle diameter retention rate (%)=[{volume average particle diameter (nm) after storage}/{volume average particle diameter (nm) before storage}]×100

Viscosity retention rate (%)=[{viscosity(mPa·s)after storage}/{viscosity(mPa·s)before storage}]×100

Furthermore, when the fluidity of the water-based pigment dispersions after storage for 4 weeks in a thermostatic bath at 60° C. was visually checked, it was found that the water-based pigment dispersions P-1 to P-15 of Examples could maintain fluidity even after storage.

On the other hand, the water-based pigment dispersions P-C1 and P-C2 of Comparative Examples could not maintain fluidity after storage for 4 weeks in a thermostatic bath at 60° C., and were gelled. In addition, an attempt was made to measure the volume average particle diameter of the gelled sample, but the measurement was not possible.

<Evaluation of High Temperature Storage Stability when Diluted>

Each of the water-based pigment dispersions of Examples 1-1 to 1-15 and Comparative Examples 1-C1 and 1-C2 was diluted 2-fold with ion-exchanged water to prepare a dispersion having a solid content concentration of 10%. Then, each dispersion was separately sealed in a glass screw tube and allowed to stand in a thermostatic bath at 60° C. for 4 weeks. Then, the volume-average particle diameter was measured, and the particle diameter retention rate (%) was obtained from the above equation. The results are shown in Table 3.

Furthermore, when the fluidity of the water-based pigment dispersions after storage for 4 weeks in a thermostatic bath at 60° C. was visually checked, it was found that the water-based pigment dispersions P-1 to P-15 of Examples maintained fluidity even after storage.

On the other hand, the water-based pigment dispersions P-C1 and P-C2 of Comparative Examples could not maintain fluidity after storage for 4 weeks in a thermostatic bath at 60° C., and were gelled. In addition, an attempt was made to measure the volume average particle diameter of the gelled sample, but the measurement was not possible. Therefore, there is a problem in practical use.

TABLE 3

| | | Example 1-1 | 1-2 | 1-3 | 1-4 | 1-5 | 1-6 | 1-7 | 1-8 | 1-9 |
|---|---|---|---|---|---|---|---|---|---|---|
| Water-based pigment dispersion number | | P-1 | P-2 | P-3 | P-4 | P-5 | P-6 | P-7 | P-8 | P-9 |
| Aluminum lake pigment (A) | Number | A-1 | A-1 | A-1 | A-1 | A-1 | A-1 | A-1 | A-1 | A-1 |
| | Blending amount (parts) | 13 | 13 | 13 | 13 | 13 | 13 | 13 | 13 | 13 |
| Pigment dispersant (B) solution | Pigment dispersant (B) number | B-1 | B-2 | B-3 | B-4 | B-5 | B-6 | B-7 | B-8 | B-9 |
| | Blending amount as solid content (parts) | 7 | 7 | 7 | 7 | 7 | 7 | 7 | 7 | 7 |
| | Solid content concentration (%) | 20 | 20 | 20 | 20 | 20 | 20 | 20 | 20 | 20 |
| | Monomer composition (%) Anionic group-containing monomer (b-1) Methacrylic acid | 17.3 | 17.3 | 17.3 | 17.3 | 17.3 | 17.3 | 17.3 | 17.3 | 4 |
| | Acrylic acid | | | | | | | | | |
| | Hydrophilic nonionic monomer (b-2) MPEGMAA (n = 2) | 82.7 | | | | | | | | |
| | MPEGMAA (n = 4) | | 82.7 | | | | | | | |
| | MPEGMAA (n = 9) | | | 82.7 | | | | | | |
| | MPEGMAA (n = 23) | | | | 82.7 | | | | | 96 |
| | MPEGMAA (n = 45) | | | | | 82.7 | | | | |
| | MPEGMAA (n = 90) | | | | | | 82.7 | | | |
| | MPEGMAA (n = 120) | | | | | | | 82.7 | | |
| | 50POEP-800B (n = 14) | | | | | | | | 82.7 | |
| | Number of moles of anionic group-containing monomer (b-1)*1 | 0.20 | 0.20 | 0.20 | 0.20 | 0.20 | 0.20 | 0.20 | 0.20 | 0.05 |
| | Number of moles of hydrophilic nonionic monomer (b-2)*1 | 0.44 | 0.30 | 0.17 | 0.07 | 0.04 | 0.02 | 0.02 | 0.09 | 0.09 |
| | Molar ratio [{monomer (b-2)}/{monomer (b-1)}] | 2.20 | 1.50 | 0.83 | 0.37 | 0.20 | 0.10 | 0.08 | 0.43 | 1.73 |
| | Acid value (mgKOH/g) | 113 | 113 | 113 | 113 | 113 | 113 | 113 | 113 | 26 |
| | Weight-average molecular weight | 51000 | 48000 | 54000 | 51000 | 53000 | 52000 | 50000 | 48000 | 44000 |
| | Degree of neutralization (mol %) | 10 | 10 | 10 | 10 | 10 | 10 | 10 | 10 | 10 |
| Water | Blending amount (parts) | 52 | 52 | 52 | 52 | 52 | 52 | 52 | 52 | 52 |
| Water-based pigment dispersion | Mass ratio [{aluminum lake pigment (A)}/{aluminum lake pigment (A) + pigment dispersant (B)}] | 0.65 | 0.65 | 0.65 | 0.65 | 0.65 | 0.65 | 0.65 | 0.65 | 0.65 |
| | Solid content concentration (%) | 20 | 20 | 20 | 20 | 20 | 20 | 20 | 20 | 20 |
| | Volume average particle diameter (nm) | 192 | 165 | 143 | 131 | 148 | 173 | 193 | 149 | 185 |
| | Viscosity (mPa · s) | 8.5 | 6.4 | 5.6 | 5.1 | 5.3 | 6.2 | 8.1 | 5.8 | 8.1 |
| Normal temperature storage stability | Presence or absence of sediment after standing at normal temperature (25° C.) for 1 week | A | A | A | A | A | A | A | A | A |
| High temperature storage stability (volume average particle diameter) | Volume average particle diameter (nm) after storage at 60° C. for 4 weeks | 352 | 176 | 149 | 131 | 156 | 183 | 235 | 156 | 253 |
| | Particle diameter retention rate (%) after storage at 60° C. for 4 weeks | 183 | 107 | 104 | 100 | 105 | 106 | 122 | 105 | 137 |
| | Volume average particle diameter (nm) diluted to 10% solid content, and after storage at 60° C. for 4 weeks | 198 | 168 | 145 | 131 | 150 | 175 | 199 | 156 | 197 |
| | Particle diameter retention rate (%) diluted to 10% solid content, and after storage at 60° C. for 4 weeks | 103 | 102 | 101 | 100 | 101 | 101 | 103 | 105 | 106 |
| High temperature storage stability (viscosity) | Viscosity (mPa · s) after storage at 60° C. for 4 weeks | 152 | 6.8 | 5.6 | 4.8 | 5.2 | 6.5 | 65 | 6.1 | 42 |
| | Viscosity retention rate (%) after storage at 60° C. for 4 weeks | 1788 | 106 | 100 | 94 | 98 | 105 | 802 | 105 | 519 |

TABLE 3-continued

| | | | | Example | | | | | | Comparative Example | |
|---|---|---|---|---|---|---|---|---|---|---|---|
| | | | | 1-10 | 1-11 | 1-12 | 1-13 | 1-14 | 1-15 | 1-C1 | 1-C2 |
| Water-based pigment dispersion number | | | | P-10 | P-11 | P-12 | P-13 | P-14 | P-15 | P-C1 | P-C2 |
| Aluminum lake pigment (A) | Number | | | A-1 | A-1 | A-1 | A-1 | A-1 | A-1 | A-1 | A-1 |
| | Blending amount (parts) | | | 13 | 13 | 13 | 13 | 13 | 13 | 13 | 13 |
| Pigment dispersant (B) solution | Pigment dispersant (B) number | | | B-10 | B-11 | B-12 | B-13 | B-14 | B-15 | B-C1 | B-C2 |
| | Blending amount as solid content (parts) | | | 7 | 7 | 7 | 7 | 7 | 7 | 7 | 7 |
| | Solid content concentration (%) | | | 20 | 20 | 20 | 20 | 20 | 20 | 20 | 20 |
| | Monomer composition (%) | Anionic group-containing monomer (b-1) | Methacrylic acid | 10 | 30 | 40 | 50 | 7.9 | | | |
| | | | Acrylic acid | | | | | 7.9 | 14.5 | | |
| | | Hydrophilic nonionic monomer (b-2) | MPEGMAA (n = 2) | | | | | | | | |
| | | | MPEGMAA (n = 4) | | | | | | | | |
| | | | MPEGMAA (n = 9) | | | | | | | | |
| | | | MPEGMAA (n = 23) | 90 | 70 | 60 | 50 | 84.2 | 85.5 | | |
| | | | MPEGMAA (n = 45) | | | | | | | | |
| | | | MPEGMAA (n = 90) | | | | | | | | |
| | | | MPEGMAA (n = 120) | | | | | | | | |
| | | | 50POEP-800B (n = 14) | | | | | | | | |
| | Number of moles of anionic group-containing monomer (b-1)*1 | | | 0.12 | 0.35 | 0.47 | 0.58 | 0.20 | 0.20 | — | — |
| | Number of moles of hydrophilic nonionic monomer (b-2)*1 | | | 0.08 | 0.06 | 0.05 | 0.04 | 0.08 | 0.08 | — | — |
| | Molar ratio [{monomer (b-2)}/{monomer (b-1)}] | | | 0.67 | 0.18 | 0.11 | 0.08 | 0.38 | 0.38 | — | — |
| | Acid value (mgKOH/g) | | | 65 | 196 | 261 | 326 | 113 | 113 | 779 | 779 |
| | Weight-average molecular weight | | | 49000 | 55000 | 54000 | 50000 | 53000 | 54000 | — | — |
| | Degree of neutralization (mol %) | | | 10 | 10 | 10 | 10 | 10 | 10 | 20 | 100 |
| Water | Blending amount (parts) | | | 52 | 52 | 52 | 52 | 52 | 52 | 52 | 52 |
| Water-based pigment dispersion | Mass ratio [{aluminum lake pigment (A)}/{aluminum lake pigment (A) + pigment dispersant (B)}] | | | 0.65 | 0.65 | 0.65 | 0.65 | 0.65 | 0.65 | 0.65 | 0.65 |
| | Solid content concentration (%) | | | 20 | 20 | 20 | 20 | 20 | 20 | 20 | 20 |
| | Volume average particle diameter (nm) | | | 153 | 138 | 140 | 191 | 134 | 136 | 667 | 3100 |
| | Viscosity (mPa · s) | | | 5.4 | 5.5 | 6.3 | 10.1 | 5.2 | 5.4 | 82 | 215 |
| Normal temperature storage stability | Presence or absence of sediment after standing at normal temperature (25° C.) for 1 week | | | A | A | A | A | A | A | B | B |
| High temperature storage stability (volume average particle diameter) | Volume average particle diameter (nm) after storage at 60° C. for 4 weeks | | | 155 | 138 | 150 | 262 | 134 | 136 | gelled | gelled |
| | Particle diameter retention rate (%) after storage at 60° C. for 4 weeks | | | 101 | 100 | 107 | 137 | 100 | 100 | — | — |
| | Volume average particle diameter (nm) diluted to 10% solid content, and after storage at 60° C. for 4 weeks | | | 153 | 138 | 142 | 194 | 134 | 136 | gelled | gelled |
| | Particle diameter retention rate (%) diluted to 10% solid content, and after storage at 60° C. for 4 weeks | | | 100 | 100 | 101 | 102 | 100 | 100 | — | — |
| High temperature storage stability (viscosity) | Viscosity (mPa · s) after storage at 60° C. for 4 weeks | | | 5.5 | 5.4 | 6.3 | 54 | 5.0 | 5.2 | gelled | gelled |
| | Viscosity retention rate (%) after storage at 60° C. for 4 weeks | | | 102 | 98 | 100 | 535 | 96 | 96 | — | — |

*1Number of moles of each monomer in 100 g of the pigment dispersant (B)

From Table 3, it is found that the water-based pigment dispersions of Examples have a high effect of reducing the dispersed particle diameter of the pigment and are excellent in normal temperature storage stability, as compared with Comparative Examples.

In addition, it is found that the water-based pigment dispersions of Examples can be stored for a long period of time even at a high temperature by preparing a water-based pigment dispersion having a solid content concentration of 10%, since the particle diameter retention rate is less than 110% when the solid content concentration is diluted to 10% in the evaluation of high temperature storage stability. For this reason, the pigment dispersion of the present invention can be made to have excellent high temperature storage stability by diluting the pigment dispersion to such an extent that there is no problem in blending the pigment dispersion into an ink.

Example 2-1 (Water-Based Ink I-1)

The water-based pigment dispersion P-1 (solid content concentration: 20%) obtained in Example 1-1 was mixed with the following composition so that in a water-based ink, the content of the aluminum lake pigment (A) was 4% and the content of the pigment dispersant (B) was 2.15%. The obtained liquid mixture was filtered with a 20 mL needleless syringe equipped with a cellulose acetate filter having a pore size of 1.2 μm (outer diameter: 2.5 cm, manufactured by Sartorius Inc.) to remove coarse particles, thereby obtaining a water-based ink I-1. The viscosity of the water-based ink I-1 at 20° C. was 4.2 mPa·s.

<Composition>

30.77 parts of water-based pigment dispersion P-1 (containing 4 parts of aluminum lake pigment A-1 and 2.15 parts of pigment dispersant B-1)

10 parts of glycerin (boiling point 290° C.)

5 parts of Liponic EG-1 (trade name, glycerin modified E0 adduct (E0 average addition mole number: 26), boiling point 381° C., manufactured by Lipo Chemicals, Inc.)

3 parts of 1,2-hexanediol (boiling point 223° C.)

51.23 parts of ion-exchanged water

Examples 2-2 to 2-15 and Comparative Examples 2-C1 and 2-C2 (Water-Based Inks I-2 to I-15 and I-C1 and I-C2)

Each water-based ink was obtained in the same manner as in Example 2-1, except that each of the water-based pigment dispersions shown in Table 4 was used instead of the water-based pigment dispersion P-1, the amount of glycerin was adjusted to the amount shown in Table 4 so that the viscosity at 20° C. was between 4.0 and 4.4 mPa·s, and the amount of residual water was adjusted. However, in Comparative Examples 2-C1 and 2-C2, the viscosity was not sufficiently lowered only by adjusting the amount of glycerin, and the viscosities were 9.4 mPa and 15.2 mPa·s, respectively.

<Evaluation of Ejection Property>

Each of the water-based inks of Examples 2-1 to 2-15 and Comparative Examples 2-C1 and 2-C2 was charged into a handy printer cartridge "HC-01K" (manufactured by Ricoh Co., Ltd.), the inside of which had been sufficiently washed with ion-exchange water and dried in advance, and a solid image having a height of 12.8 mm and a width of 30 mm was printed on plain paper as a recording medium at 100% duty using a RICOH Handy Printer (trade name, manufactured by Ricoh Co., Ltd.).

All of the water-based inks I-1 to I-15 of Examples could be ejected without any problem.

On the other hand, the water-based inks I-C1 and I-C2 of Comparative Examples did not have a desired viscosity even when the content of glycerin in the ink was reduced to 0%, the ink head channel inside the cartridge was not filled, and the evaluation of the ejection property could not be performed. Table 4 shows the results in the following notation.

A: The ink could be ejected without any problem, and a solid image could be printed.

B: The ink could not be ejected, and a solid image could not be printed.

<Evaluation of Decap Property>

Using an ink cartridge filled with each of the water-based inks of Examples 2-1 to 2-15 and Comparative Examples 2-C1 and 2-C2, a solid image having a height of 12.8 mm and a width of 30 mm was printed at 100% duty. Then, the ink nozzle surface was wiped with ASPURE Wiper (manufactured by AS ONE Corporation) moistened with ion-exchanged water. After the nozzle surface was left downward for a predetermined period of time in a non-wind environment at a temperature of 25° C. and a humidity of 50%, a solid image having a height of 12.8 mm and a width of 30 mm was printed again at 100% duty. The degree of blurring at the printing start position was observed and evaluated as the time required for maintenance. The longer the time required for maintenance, the more excellent the decap property. The results are shown in Table 4.

[Evaluation Criteria (Time Required for Maintenance)]

120 seconds: No blurring was observed even when the nozzle surface was left for 120 seconds.

90 seconds: No blurring was observed even when the nozzle surface was left for 90 seconds, but blurring occurred when the nozzle surface was left for 120 seconds.

60 seconds: No blurring was observed even when the nozzle surface was left for 60 seconds, but blurring occurred when the nozzle surface was left for 90 seconds.

30 seconds: No blurring was observed even when the nozzle surface was left for 30 seconds, but blurring occurred when the nozzle surface was left for 60 seconds.

15 seconds: No blurring was observed even when the nozzle surface was left for 15 seconds, but blurring occurred when the nozzle surface was left for 30 seconds.

0 second: Blurring was not observed immediately after wiping, but blurring occurred when the nozzle surface was left for 15 seconds.

Non-ejection: Ejection was impossible.

TABLE 4

| | Example 2-1 | 2-2 | 2-3 | 2-4 | 2-5 | 2-6 | 2-7 | 2-8 | 2-9 |
|---|---|---|---|---|---|---|---|---|---|
| Ink type | I-1 | I-2 | I-3 | I-4 | I-5 | I-6 | I-7 | I-8 | I-9 |
| Water-based pigment dispersion number | P-1 | P-2 | P-3 | P-4 | P-5 | P-6 | P-7 | P-8 | P-9 |
| Aluminum lake pigment (A) — Number | A-1 | A-1 | A-1 | A-1 | A-1 | A-1 | A-1 | A-1 | A-1 |
| Pigment dispersant (B) — Number | B-1 | B-2 | B-3 | B-4 | B-5 | B-6 | B-7 | B-8 | B-9 |
| Monomer composition (%) — Anionic group-containing monomer (b-1) — Methacrylic acid | 17.3 | 17.3 | 17.3 | 17.3 | 17.3 | 17.3 | 17.3 | 17.3 | 4 |
| Acrylic acid | | | | | | | | | |
| Hydrophilic nonionic monomer (b-2) — MPEGMAA (n = 2) | 82.7 | | | | | | | | |
| MPEGMAA (n = 4) | | 82.7 | | | | | | | |
| MPEGMAA (n = 9) | | | 82.7 | | | | | | |
| MPEGMAA (n = 23) | | | | 82.7 | | | | | 96 |
| MPEGMAA (n = 45) | | | | | 82.7 | | | | |
| MPEGMAA (n = 90) | | | | | | 82.7 | | | |
| MPEGMAA (n = 120) | | | | | | | 82.7 | | |
| 50POEP-800B (n = 14) | | | | | | | | 82.7 | |
| Number of moles of anionic group-containing monomer (b-1)*1 | 0.20 | 0.20 | 0.20 | 0.20 | 0.20 | 0.20 | 0.20 | 0.20 | 0.05 |
| Number of moles of hydrophilic nonionic monomer (b-2)*1 | 0.44 | 0.30 | 0.17 | 0.07 | 0.04 | 0.02 | 0.02 | 0.09 | 0.09 |
| Molar ratio [{monomer (b-2)}/{monomer (b-1)}] | 2.20 | 1.50 | 0.83 | 0.37 | 0.20 | 0.10 | 0.08 | 0.43 | 1.73 |
| Acid value (mgKOH/g) | 113 | 113 | 113 | 113 | 113 | 113 | 113 | 113 | 26 |
| Weight-average molecular weight | 51000 | 48000 | 54000 | 51000 | 53000 | 52000 | 50000 | 48000 | 44000 |
| Degree of neutralization (mol %) | 10 | 10 | 10 | 10 | 10 | 10 | 10 | 10 | 10 |
| Water-based ink blend composition (parts) — Water-based pigment dispersion | 30.77 | 30.77 | 30.77 | 30.77 | 30.77 | 30.77 | 30.77 | 30.77 | 30.77 |
| Glycerin | 10 | 13 | 15 | 15 | 15 | 13 | 10 | 15 | 10 |
| Liponic EG-1 | 5 | 5 | 5 | 5 | 5 | 5 | 5 | 5 | 5 |
| 1,2-hexandiol | 3 | 3 | 3 | 3 | 3 | 3 | 3 | 3 | 3 |
| Water | 51.23 | 48.23 | 46.23 | 46.23 | 46.23 | 48.23 | 51.23 | 46.23 | 51.23 |
| Content (%) of aluminum lake pigment (A) in water-based ink | 4 | 4 | 4 | 4 | 4 | 4 | 4 | 4 | 4 |
| Content (%) of pigment dispersant (B) in water-based ink | 2.15 | 2.15 | 2.15 | 2.15 | 2.15 | 2.15 | 2.15 | 2.15 | 2.15 |
| Mass ratio of water-based ink [{aluminum lake pigment (A)}/{aluminum lake pigment (A) + pigment dispersant (B)}] | 0.65 | 0.65 | 0.65 | 0.65 | 0.65 | 0.65 | 0.65 | 0.65 | 0.65 |
| Viscosity (mPa · s) of water-based ink | 4.2 | 4.3 | 4.2 | 4.0 | 4.1 | 4.2 | 4.3 | 4.1 | 4.4 |
| Evaluation — Ejection property | A | A | A | A | A | A | A | A | A |
| Decap property (Standby time required for maintenance (sec)) | 60 | 90 | 120 | 120 | 120 | 90 | 60 | 120 | 30 |

| | Example 2-10 | 2-11 | 2-12 | 2-13 | 2-14 | 2-15 | Comparative Example 2-C1 | 2-C2 |
|---|---|---|---|---|---|---|---|---|
| Ink type | I-10 | I-11 | I-12 | I-13 | I-14 | I-15 | I-C1 | I-C2 |
| Water-based pigment dispersion number | P-10 | P-11 | P-12 | P-13 | P-14 | P-15 | P-C1 | P-C2 |
| Aluminum lake pigment (A) — Number | A-1 | A-1 | A-1 | A-1 | A-1 | A-1 | A-1 | A-1 |

TABLE 4-continued

| | | | | B-10 | B-11 | B-12 | B-13 | B-14 | B-15 | B-C1 | B-C2 |
|---|---|---|---|---|---|---|---|---|---|---|---|
| Pigment dispersant (B) | Number | | | B-10 | B-11 | B-12 | B-13 | B-14 | B-15 | B-C1 | B-C2 |
| | Monomer composition (%) | Anionic group-containing monomer (b-1) | Methacrylic acid | 10 | 30 | 40 | 50 | 7.9 | | | |
| | | | Acrylic acid | | | | | 7.9 | 14.5 | | |
| | | Hydrophilic nonionic monomer (b-2) | MPEGMAA (n = 2) | | | | | | | | |
| | | | MPEGMAA (n = 4) | | | | | | | | |
| | | | MPEGMAA (n = 9) | | | | | | | | |
| | | | MPEGMAA (n = 23) | 90 | 70 | 60 | 50 | 84.2 | 85.5 | | |
| | | | MPEGMAA (n = 45) | | | | | | | | |
| | | | MPEGMAA (n = 90) | | | | | | | | |
| | | | MPEGMAA (n = 120) | | | | | | | | |
| | | | 50POEP-800B (n = 14) | | | | | | | | |
| | Number of moles of anionic group-containing monomer (b-1)*1 | | | 0.12 | 0.35 | 0.47 | 0.58 | 0.20 | 0.20 | — | — |
| | Number of moles of hydrophilic nonionic monomer (b-2)*1 | | | 0.08 | 0.06 | 0.05 | 0.04 | 0.08 | 0.08 | — | — |
| | Molar ratio [{monomer (b-2)}/{monomer (b-1)}] | | | 0.67 | 0.18 | 0.11 | 0.08 | 0.38 | 0.38 | — | — |
| | Acid value (mgKOH/g) | | | 65 | 196 | 261 | 326 | 113 | 113 | 779 | 779 |
| | Weight-average molecular weight | | | 49000 | 55000 | 54000 | 50000 | 53000 | 54000 | — | — |
| | Degree of neutralization (mol %) | | | 10 | 10 | 10 | 10 | 10 | 10 | 20 | 100 |
| Water-based ink blend composition (parts) | Water-based pigment dispersion | | | 30.77 | 30.77 | 30.77 | 30.77 | 30.77 | 30.77 | 30.77 | 30.77 |
| | Glycerin | | | 14 | 14 | 13 | 5 | 15 | 13 | 0 | 0 |
| | Liponic EG-1 | | | 5 | 5 | 5 | 5 | 5 | 5 | 5 | 5 |
| | 1,2-hexandiol | | | 3 | 3 | 3 | 3 | 3 | 3 | 3 | 3 |
| | Water | | | 47.23 | 47.23 | 48.23 | 56.23 | 46.23 | 48.23 | 61.23 | 61.23 |
| Content (%) of aluminum lake pigment (A) in water-based ink | | | | 4 | 4 | 4 | 4 | 4 | 4 | 4 | 4 |
| Content (%) of pigment dispersant (B) in water-based ink | | | | 2.15 | 2.15 | 2.15 | 2.15 | 2.15 | 2.15 | 2.15 | 2.15 |
| Mass ratio of water-based ink [{aluminum lake pigment (A)}/{aluminum lake pigment (A) + pigment dispersant (B)}] | | | | 0.65 | 0.65 | 0.65 | 0.65 | 0.65 | 0.65 | 0.65 | 0.65 |
| Viscosity (mPa · s) of water-based ink | | | | 4.1 | 4.1 | 4.2 | 4.4 | 4.1 | 4.3 | 9.4 | 15.2 |
| Evaluation | Ejection property | | | A | A | A | A | A | A | B | B |
| | Decap property (Standby time required for maintenance (sec)) | | | 90 | 90 | 60 | 15 | 120 | 90 | Non-ejection | Non-ejection |

*1Number of moles of each monomer in 100 g of the pigment dispersant (B)

From Table 4, it is found that the water-based inks of Examples are excellent in the ejection property and the decap property as compared with Comparative Examples.

Examples 3-1 to 3-7 (Water-Based Pigment Dispersions P-16 to P-22)

Water-based pigment dispersions P-16 to P-22 (solid content concentration: 20%) were obtained in the same manner as in Example 1-1 except that the blending amount of the aluminum lake pigment (A) and the type and the blending amount as solid content of the solution of the pigment dispersant (B) were changed as shown in Table 5.

[Evaluations]

<Effect of Reducing Dispersed Particle Diameter of Pigment>

(Volume Average Particle Diameter)

The volume average particle diameter of each of the water-based pigment dispersions of Examples 3-1 to 3-7 was measured. The results are shown in Table 5.

(Viscosity)

The viscosity of each of the water-based pigment dispersions of Examples 3-1 to 3-7 was measured. The results are shown in Table 5.

The viscosities of the water-based pigment dispersions P-16 to P-22 were all 20 mPa·s or less, and when the water-based pigment dispersions were filtered using a cellulose acetate-made syringe filter having a pore size of 5 μm, a reduction in filtration rate due to pressure loss did not occur. Also in this respect, it is found that the dispersed particle diameter of the pigment is reduced.

<Evaluation of Normal Temperature Storage Stability>

Each of the water-based pigment dispersions of Examples 3-1 to 3-7 was allowed to stand at normal temperature, the presence or absence of sediment was visually checked, and the normal temperature storage stability was evaluated according to the aforementioned evaluation criteria. The results are shown in Table 5.

<Evaluation of High Temperature Storage Stability>

Each of the water-based pigment dispersions of Examples 3-1 to 3-7 was sealed in a glass screw tube and allowed to stand in a thermostatic bath at 60° C. for 4 weeks. Then, the particle diameter was measured and the particle diameter retention rate (%) and the viscosity retention rate (%) were determined by the above equations. The results are shown in Table 5.

Furthermore, when the fluidity of the water-based pigment dispersions after storage was visually checked, it was found that the water-based pigment dispersions P-16 to P-22 maintained fluidity after storage.

<Evaluation of High Temperature Storage Stability when Diluted>

Each of the water-based pigment dispersions of Examples 3-1 to 3-7 was diluted in the same manner as described above and allowed to stand in a thermostatic bath at 60° C. for 4 weeks. Then, the particle diameter was measured and the particle diameter retention rate (%) was determined by the above equation. The results are shown in Table 5.

Furthermore, when the fluidity of the water-based pigment dispersions after storage was visually checked, it was found that the water-based pigment dispersions P-16 to P-22 of Examples maintained fluidity even after storage.

TABLE 5

| | | Example | | | | | | | |
|---|---|---|---|---|---|---|---|---|---|
| | | 3-1 | 3-2 | 3-3 | 1-4 | 3-4 | 3-5 | 3-6 | 3-7 |
| Water-based pigment dispersion number | | P-16 | P-17 | P-18 | P-4 | P-19 | P-20 | P-21 | P-22 |
| Aluminum lake pigment (A) | Number | A-1 | A-1 | A-1 | A-1 | A-1 | A-1 | A-1 | A-1 |
| | Blending amount (parts) | 17 | 16 | 14 | 13 | 11 | 10 | 8 | 7 |
| Pigment dispersant (B) solution | Pigment dispersant (B) number | B-4 | B-4 | B-4 | B-4 | B-4 | B-4 | B-4 | B-4 |
| | Blending amount as solid content (parts) | 3 | 4 | 6 | 7 | 9 | 10 | 12 | 13 |
| | Solid content concentration (mass %) | 20 | 20 | 20 | 20 | 20 | 20 | 20 | 20 |
| | Monomer composition (%) Methacrylic acid | 17.3 | 17.3 | 17.3 | 17.3 | 17.3 | 17.3 | 17.3 | 17.3 |
| | Monomer composition (%) MPEGMAA (n = 23) | 82.7 | 82.7 | 82.7 | 82.7 | 82.7 | 82.7 | 82.7 | 82.7 |
| | Number of moles of anionic group-containing monomer (b-1)*1 | 0.20 | 0.20 | 0.20 | 0.20 | 0.20 | 0.20 | 0.20 | 0.20 |
| | Number of moles of hydrophilic nonionic monomer (b-2)*1 | 0.07 | 0.07 | 0.07 | 0.07 | 0.07 | 0.07 | 0.07 | 0.07 |
| | Molar ratio [{monomer (b-2)}/{monomer (b-1)}] | 0.37 | 0.37 | 0.37 | 0.37 | 0.37 | 0.37 | 0.37 | 0.37 |
| | Acid value (mgKOH/g) | 113 | 113 | 113 | 113 | 113 | 113 | 113 | 113 |
| | Weight-average molecular weight | 51000 | 51000 | 51000 | 51000 | 51000 | 51000 | 51000 | 51000 |
| | Degree of neutralization (mol %) | 10 | 10 | 10 | 10 | 10 | 10 | 10 | 10 |
| Water | Blending amount (parts) | 68 | 64 | 56 | 52 | 44 | 40 | 32 | 28 |
| Water-based pigment dispersion | Mass ratio [{aluminum lake pigment (A)}/{aluminum lake pigment (A) + pigment dispersant (B)}] | 0.85 | 0.80 | 0.70 | 0.65 | 0.55 | 0.50 | 0.40 | 0.35 |
| | Solid content concentration (%) | 20 | 20 | 20 | 20 | 20 | 20 | 20 | 20 |
| | Volume average particle diameter (nm) | 164 | 143 | 134 | 131 | 153 | 166 | 163 | 188 |
| | Viscosity (mPa · s) | 4.8 | 5.9 | 5.1 | 5.1 | 6.7 | 7.5 | 9.9 | 10.4 |
| Normal temperature storage stability | Presence or absence of sediment after standing at normal temperature (25° C.) for 1 week | A | A | A | A | A | A | A | A |
| High temperature storage | Volume average particle diameter (nm) after storage at 60° C. for 4 weeks | 371 | 291 | 144 | 131 | 154 | 172 | 164 | 202 |

TABLE 5-continued

| | | Example | | | | | | | |
|---|---|---|---|---|---|---|---|---|---|
| | | 3-1 | 3-2 | 3-3 | 1-4 | 3-4 | 3-5 | 3-6 | 3-7 |
| stability (volume average particle diameter) | Particle diameter retention rate (%) after storage at 60° C. for 4 weeks | 226 | 203 | 107 | 100 | 101 | 104 | 101 | 107 |
| | Volume average particle diameter (nm) diluted to 10% solid content, and after storage at 60° C. for 4 weeks | 168 | 148 | 135 | 131 | 155 | 169 | 168 | 190 |
| | Particle diameter retention rate (%) diluted to 10% solid content, and after storage at 60° C. for 4 weeks | 102 | 103 | 101 | 100 | 101 | 102 | 103 | 101 |
| High temperature storage stability (viscosity) | Viscosity (mPa · s) after storage at 60° C. for 4 weeks | 57.1 | 31.7 | 4.9 | 4.8 | 6.1 | 6.9 | 9.0 | 9.5 |
| | Viscosity retention rate (%) after storage at 60° C. for 4 weeks | 1190 | 537 | 96 | 94 | 91 | 92 | 91 | 91 |

*1Number of moles of each monomer in 100 g of the pigment dispersant (B)

From Table 5, it is found that the water-based pigment dispersions of Examples have a high effect of reducing the dispersed particle diameter of the pigment and are excellent in normal temperature storage stability.

In addition, it is found that the water-based pigment dispersions of Examples can be stored for a long period of time even at a high temperature by preparing a water-based pigment dispersion having a solid content concentration of 10%, since the particle diameter retention rate is less than 110% when the solid content concentration is diluted to 10% in the evaluation of high temperature storage stability. For this reason, the pigment dispersion of the present invention can be made to have excellent high temperature storage stability by diluting the pigment dispersion to such an extent that there is no problem in blending the pigment dispersion into an ink.

Examples 4-1 to 4-7 (Water-Based Inks I-16 to I-22)

Each water-based ink was obtained in the same manner as in Example 2-1, except that each of the water-based pigment dispersions shown in Table 6 was used instead of the water-based pigment dispersion P-1, the amount of glycerin was adjusted to the amount shown in Table 6 so that the viscosity at 20° C. was between 4.0 and 4.4 mPa·s, and the amount of residual water was adjusted. Using each of the obtained water-based inks, the aforementioned ejection property and decap property were evaluated. The results are shown in Table 6.

TABLE 6

| | | | Example | | | | | | | |
|---|---|---|---|---|---|---|---|---|---|---|
| | | | 4-1 | 4-2 | 4-3 | 2-4 | 4-4 | 4-5 | 4-6 | 4-7 |
| Ink number | | | I-16 | I-17 | I-18 | I-4 | I-19 | I-20 | I-21 | I-22 |
| Water-based pigment dispersion number | | | P-16 | P-17 | P-18 | P-4 | P-19 | P-20 | P-21 | P-22 |
| Aluminum lake pigment (A) | Number | | A-1 | A-1 | A-1 | A-1 | A-1 | A-1 | A-1 | A-1 |
| Pigment dispersant (B) | Number | | B-4 | B-4 | B-4 | B-4 | B-4 | B-4 | B-4 | B-4 |
| | Monomer composition (%) | Methacrylic acid | 17.3 | 17.3 | 17.3 | 17.3 | 17.3 | 17.3 | 17.3 | 17.3 |
| | | MPEGMAA (n = 23) | 82.7 | 82.7 | 82.7 | 82.7 | 82.7 | 82.7 | 82.7 | 82.7 |
| | Number of moles of anionic group-containing monomer (b-1)*1 | | 0.20 | 0.20 | 0.20 | 0.20 | 0.20 | 0.20 | 0.20 | 0.20 |
| | Number of moles of hydrophilic nonionic monomer (b-2)*1 | | 0.07 | 0.07 | 0.07 | 0.07 | 0.07 | 0.07 | 0.07 | 0.07 |
| | Molar ratio [{monomer (b-2)}/{monomer (b-1)}] | | 0.37 | 0.37 | 0.37 | 0.37 | 0.37 | 0.37 | 0.37 | 0.37 |
| | Acid value (mgKOH/g) | | 113 | 113 | 113 | 113 | 113 | 113 | 113 | 113 |
| | Weight-average molecular weight | | 51000 | 51000 | 51000 | 51000 | 51000 | 51000 | 51000 | 51000 |
| | Degree of neutralization (mol %) | | 10 | 10 | 10 | 10 | 10 | 10 | 10 | 10 |

TABLE 6-continued

| | | Example | | | | | | | |
|---|---|---|---|---|---|---|---|---|---|
| | | 4-1 | 4-2 | 4-3 | 2-4 | 4-4 | 4-5 | 4-6 | 4-7 |
| Water-based ink blend composition (parts) | Water-based pigment dispersion | 23.53 | 25.00 | 28.57 | 30.77 | 36.36 | 40.00 | 50.00 | 57.14 |
| | Glycerin | 17 | 15 | 16 | 15 | 13 | 11 | 7 | 5 |
| | Liponic EG-1 | 5 | 5 | 5 | 5 | 5 | 5 | 5 | 5 |
| | 1,2-hexandiol | 3 | 3 | 3 | 3 | 3 | 3 | 3 | 3 |
| | Water | 51.47 | 52.00 | 47.43 | 46.23 | 42.64 | 41.00 | 35.00 | 29.86 |
| Content (%) of aluminum lake pigment (A) in water-based ink | | 4 | 4 | 4 | 4 | 4 | 4 | 4 | 4 |
| Content (%) of pigment dispersant (B) in water-based ink | | 0.71 | 1.00 | 1.71 | 2.15 | 3.27 | 4.00 | 6.00 | 7.43 |
| Mass ratio of water-based ink [{aluminum lake pigment (A)}/{aluminum lake pigment (A) + pigment dispersant (B)}] | | 0.85 | 0.80 | 0.70 | 0.65 | 0.55 | 0.50 | 0.40 | 0.35 |
| Viscosity (mPa · s) of water-based ink | | 4.3 | 4.2 | 4.1 | 4.0 | 4.4 | 4.3 | 4.0 | 4.1 |
| Evaluation | Ejection property | A | A | A | A | A | A | A | A |
| | Decap property (Standby time required for maintenance (sec)) | 120 | 120 | 120 | 120 | 90 | 90 | 30 | 30 |

*1Number of moles of each monomer in 100 g of the pigment dispersant (B)

From Table 6, it is found that the water-based inks of Examples are excellent in the ejection property and the decap property.

Production Examples 16 to 23 (Production of Solutions of Pigment Dispersants (B-16) to (B-23))

Solutions of pigment dispersants (B-16) to (B-23) were obtained in the same manner as in Production Example 1, except that the monomer composition and the amount of sodium hydroxide used for neutralization were changed to those shown in Table 7.

TABLE 7

| | | Production Example | | | | | | | | |
|---|---|---|---|---|---|---|---|---|---|---|
| | | 4 | 16 | 17 | 18 | 19 | 20 | 21 | 22 | 23 |
| Pigment dispersant (B) number | | B-4 | B-16 | B-17 | B-18 | B-19 | B-20 | B-21 | B-22 | B-23 |
| Monomer composition (%) | Methacrylic acid | 17.3 | 17.3 | 17.3 | 17.3 | 17.3 | 17.3 | 17.3 | 17.3 | 17.3 |
| | MPEGMAA (n = 23) | 82.7 | 82.7 | 82.7 | 82.7 | 82.7 | 82.7 | 82.7 | 82.7 | 82.7 |
| Properties of pigment dispersant (B) | Acid value (mgKOH/g) | 113 | 113 | 113 | 113 | 113 | 113 | 113 | 113 | 113 |
| | Weight-average molecular weight | 51000 | 51000 | 51000 | 51000 | 51000 | 51000 | 51000 | 51000 | 51000 |
| Added NaOH amount (mg) | | 806 | 2014 | 2417 | 2820 | 3223 | 3626 | 4029 | 5640 | 7251 |
| Degree of neutralization (mol %) | | 10 | 25 | 30 | 35 | 40 | 45 | 50 | 70 | 90 |
| Solid content concentration (%) of pigment dispersant (B) solution | | 20 | 20 | 20 | 20 | 20 | 20 | 20 | 20 | 20 |

Examples 5-1 to 5-8 (Water-Based Pigment Dispersions P-31 to P-38)

Each of water-based pigment dispersions P-31 to P-38 (solid content concentration: 20%) was obtained in the same manner as in Example 1-1 except that the solution was changed to the solution of the pigment dispersant (B) shown in Table 8.

[Evaluations]

<Evaluation of Effect of Reducing Dispersed Particle Diameter of Pigment>

(Volume Average Particle Diameter)

The volume average particle diameter of each of the water-based pigment dispersions of Examples 5-1 to 5-8 was measured. The results are shown in Table 8.

(Viscosity)

The viscosity of each of the water-based pigment dispersions of Examples 5-1 to 5-8 was measured. The results are shown in Table 8.

The viscosities of the water-based pigment dispersions P-31 to P-38 were all 20 mPa·s or less, and when the water-based pigment dispersions were filtered using a cellulose acetate-made syringe filter having a pore size of 5 μm, a reduction in filtration rate due to pressure loss did not occur. Also in this respect, it is found that the dispersed particle diameter of the pigment is reduced.

<Evaluation of Normal Temperature Storage Stability>

Each of the water-based pigment dispersions of Examples 5-1 to 5-8 was allowed to stand at normal temperature, the presence or absence of sediment was visually checked, and the normal temperature storage stability was evaluated according to the aforementioned evaluation criteria. The results are shown in Table 8.

<Evaluation of High Temperature Storage Stability>

Each of the water-based pigment dispersions of Examples 5-1 to 5-8 was sealed in a glass screw tube and allowed to stand in a thermostatic bath at 60° C. for 4 weeks. Then, the particle diameter was measured and the particle diameter retention rate (%) and the viscosity retention rate (%) were determined by the above equations. The results are shown in Table 8.

Furthermore, when the fluidity of the water-based pigment dispersions after storage for 4 weeks in a thermostatic bath at 60° C. was visually checked, it was found that the water-based pigment dispersions P-31 to P-38 maintained fluidity after storage.

TABLE 8

| | | | Example | | | | | | | | |
|---|---|---|---|---|---|---|---|---|---|---|---|
| | | | 1-4 | 5-1 | 5-2 | 5-3 | 5-4 | 5-5 | 5-6 | 5-7 | 5-8 |
| Water-based pigment dispersion number | | | P-4 | P-31 | P-32 | P-33 | P-34 | P-35 | P-36 | P-37 | P-38 |
| Aluminum lake pigment (A) | Number | | A-1 | A-1 | A-1 | A-1 | A-1 | A-1 | A-1 | A-1 | A-1 |
| | Blending amount (parts) | | 13 | 13 | 13 | 13 | 13 | 13 | 13 | 13 | 13 |
| Pigment dispersant (B) solution | Pigment dispersant (B) number | | B-4 | B-16 | B-17 | B-18 | B-19 | B-20 | B-21 | B-22 | B-23 |
| | Blending amount as solid content (parts) | | 7 | 7 | 7 | 7 | 7 | 7 | 7 | 7 | 7 |
| | Solid content concentration (%) | | 20 | 20 | 20 | 20 | 20 | 20 | 20 | 20 | 20 |
| | Monomer composition (%) | Methacrylic acid | 17.3 | 17.3 | 17.3 | 17.3 | 17.3 | 17.3 | 17.3 | 17.3 | 17.3 |
| | | MPEGMAA (n = 23) | 82.7 | 82.7 | 82.7 | 82.7 | 82.7 | 82.7 | 82.7 | 82.7 | 82.7 |
| | Number of moles of anionic group-containing monomer (b-1)*1 | | 0.20 | 0.20 | 0.20 | 0.20 | 0.20 | 0.20 | 0.20 | 0.20 | 0.20 |
| | Number of moles of hydrophilic nonionic monomer (b-2)*1 | | 0.07 | 0.07 | 0.07 | 0.07 | 0.07 | 0.07 | 0.07 | 0.07 | 0.07 |
| | Molar ratio [{monomer (b-2)}/{monomer (b-1)}] | | 0.37 | 0.37 | 0.37 | 0.37 | 0.37 | 0.37 | 0.37 | 0.37 | 0.37 |
| | Acid value (mgKOH/g) | | 113 | 113 | 113 | 113 | 113 | 113 | 113 | 113 | 113 |
| | Weight-average molecular weight | | 51000 | 51000 | 51000 | 51000 | 51000 | 51000 | 51000 | 51000 | 51000 |
| | Degree of neutralization (mol %) | | 10 | 25 | 30 | 35 | 40 | 45 | 50 | 70 | 90 |
| Water | Blending amount (parts) | | 52 | 52 | 52 | 52 | 52 | 52 | 52 | 52 | 52 |
| Water-based pigment dispersion | Mass ratio [{aluminum lake pigment (A)}/{aluminum lake pigment (A) + pigment dispersant (B)}] | | 0.65 | 0.65 | 0.65 | 0.65 | 0.65 | 0.65 | 0.65 | 0.65 | 0.65 |
| | Solid content concentration (%) | | 20 | 20 | 20 | 20 | 20 | 20 | 20 | 20 | 20 |
| | pH | | 5.4 | 5.6 | 5.8 | 5.9 | 6.0 | 6.1 | 6.2 | 6.6 | 6.8 |
| | Volume average particle diameter (nm) | | 131 | 151 | 149 | 145 | 161 | 166 | 170 | 175 | 185 |
| | Viscosity (mPa · s) | | 5.1 | 5.6 | 5.6 | 5.9 | 6.0 | 6.1 | 6.1 | 6.4 | 7.5 |
| Normal temperature storage stability | Presence or absence of sediment after standing at normal temperature (25° C.) for 1 week | | A | A | A | A | A | A | A | A | A |
| High temperature storage stability (volume average particle diameter) | Volume average particle diameter (nm) after storage at 60° C. for 4 weeks | | 131 | 154 | 151 | 146 | 163 | 172 | 178 | 191 | 192 |
| | Particle diameter retention rate (%) after storage at 60° C. for 4 weeks | | 100 | 102 | 101 | 101 | 101 | 104 | 105 | 109 | 104 |
| High temperature storage stability (viscosity) | Viscosity (mPa · s) after storage at 60° C. for 4 weeks | | 4.8 | 5.4 | 5.5 | 5.9 | 6.0 | 6.2 | 6.2 | 6.7 | 8.0 |
| | Viscosity retention rate (%) after storage at 60° C. for 4 weeks | | 94 | 96 | 98 | 100 | 100 | 102 | 102 | 105 | 107 |

*1Number of moles of each monomer in 100 g of the pigment dispersant (B)

From Table 8, it is found that the water-based pigment dispersions of Examples have a high effect of reducing the dispersed particle diameter of the pigment and are excellent in normal temperature storage stability.

In addition, since the water-based pigment dispersions of Examples have a particle diameter retention rate of less than 110% and a viscosity retention rate of 90% or more and 110% or less in the evaluation of high temperature storage stability, it is found that even a high concentration water-based pigment dispersion having a solid content concentration of 20% can be stored at a high temperature for a long period of time.

Examples 6-1 to 6-8 (Water-Based Inks I-31 to I-38)

Each water-based ink was obtained in the same manner as in Example 2-1, except that each of the water-based pigment dispersions shown in Table 9 was used instead of the water-based pigment dispersion P-1, the amount of glycerin was adjusted to the amount shown in Table 9 so that the viscosity at 20° C. was between 4.0 and 4.4 mPa·s, and the amount of residual water was adjusted. Using each of the obtained water-based inks, the aforementioned ejection property and decap property were evaluated. The results are shown in Table 9.

TABLE 9

| | | | Example | | | | |
|---|---|---|---|---|---|---|---|
| | | | 2-4 | 6-1 | 6-2 | 6-3 | 6-4 |
| Ink number | | | I-4 | I-31 | I-32 | I-33 | I-34 |
| Water-based pigment dispersion number | | | P-4 | P-31 | P-32 | P-33 | P-34 |
| Aluminum lake pigment (A) | Number | | A-1 | A-1 | A-1 | A-1 | A-1 |
| Pigment dispersant (B) | Number | | B-4 | B-16 | B-17 | B-18 | B-19 |
| | Monomer composition (%) | Methacrylic acid | 17.3 | 17.3 | 17.3 | 17.3 | 17.3 |
| | | MPEGMAA (n = 23) | 82.7 | 82.7 | 82.7 | 82.7 | 82.7 |
| | Number of moles of anionic group-containing monomer (b-1)*1 | | 0.20 | 0.20 | 0.20 | 0.20 | 0.20 |
| | Number of moles of hydrophilic nonionic monomer (b-2)*1 | | 0.07 | 0.07 | 0.07 | 0.07 | 0.07 |
| | Molar ratio [{monomer (b-2)}/{monomer (b-1)}] | | 0.37 | 0.37 | 0.37 | 0.37 | 0.37 |
| | Acid value (mgKOH/g) | | 113 | 113 | 113 | 113 | 113 |
| | Weight-average molecular weight | | 51000 | 51000 | 51000 | 51000 | 51000 |
| | Degree of neutralization (mol %) | | 10 | 25 | 30 | 35 | 40 |
| Water-based ink blend composition (parts) | Water-based pigment dispersion | | 30.77 | 30.77 | 30.77 | 30.77 | 30.77 |
| | Glycerin | | 15 | 15 | 15 | 14 | 14 |
| | Liponic EG-1 | | 5 | 5 | 5 | 5 | 5 |
| | 1,2-hexandiol | | 3 | 3 | 3 | 3 | 3 |
| | Water | | 46.23 | 46.23 | 46.23 | 47.23 | 47.23 |
| Content (%) of aluminum lake pigment (A) in water-based ink | | | 4 | 4 | 4 | 4 | 4 |
| Content (%) of pigment dispersant (B) in water-based ink | | | 2.15 | 2.15 | 2.15 | 2.15 | 2.15 |
| Mass ratio of water-based ink [{aluminum lake pigment (A)}/{aluminum lake pigment (A) + pigment dispersant (B)}] | | | 0.65 | 0.65 | 0.65 | 0.65 | 0.65 |
| Viscosity (mPa · s) of water-based ink | | | 4.0 | 4.2 | 4.3 | 4.2 | 4.2 |
| Evaluation | Ejection property | | A | A | A | A | A |
| | Decap property (Standby time required for maintenance (sec)) | | 120 | 120 | 120 | 90 | 90 |

| | | | Example | | | |
|---|---|---|---|---|---|---|
| | | | 6-5 | 6-6 | 6-7 | 6-8 |
| Ink number | | | I-35 | I-36 | I-37 | I-38 |
| Water-based pigment dispersion number | | | P-35 | P-36 | P-37 | P-38 |
| Aluminum lake pigment (A) | Number | | A-1 | A-1 | A-1 | A-1 |
| Pigment dispersant (B) | Number | | B-20 | B-21 | B-22 | B-23 |
| | Monomer composition (%) | Methacrylic acid | 17.3 | 17.3 | 17.3 | 17.3 |
| | | MPEGMAA (n = 23) | 82.7 | 82.7 | 82.7 | 82.7 |
| | Number of moles of anionic group-containing monomer (b-1)*1 | | 0.20 | 0.20 | 0.20 | 0.20 |
| | Number of moles of hydrophilic nonionic monomer (b-2)*1 | | 0.07 | 0.07 | 0.07 | 0.07 |
| | Molar ratio [{monomer (b-2)}/{monomer (b-1)}] | | 0.37 | 0.37 | 0.37 | 0.37 |
| | Acid value (mgKOH/g) | | 113 | 113 | 113 | 113 |
| | Weight-average molecular weight | | 51000 | 51000 | 51000 | 51000 |
| | Degree of neutralization (mol %) | | 45 | 50 | 70 | 90 |
| Water-based ink blend composition (parts) | Water-based pigment dispersion | | 30.77 | 30.77 | 30.77 | 30.77 |
| | Glycerin | | 13 | 13 | 13 | 11 |
| | Liponic EG-1 | | 5 | 5 | 5 | 5 |
| | 1,2-hexandiol | | 3 | 3 | 3 | 3 |
| | Water | | 48.23 | 48.23 | 48.23 | 50.23 |
| Content (%) of aluminum lake pigment (A) in water-based ink | | | 4 | 4 | 4 | 4 |
| Content (%) of pigment dispersant (B) in water-based ink | | | 2.15 | 2.15 | 2.15 | 2.15 |
| Mass ratio of water-based ink [{aluminum lake pigment (A)}/{aluminum lake pigment (A) + pigment dispersant (B)}] | | | 0.65 | 0.65 | 0.65 | 0.65 |

TABLE 9-continued

| | | | | | |
|---|---|---|---|---|---|
| Viscosity (mPa · s) of water-based ink | | 4.3 | 4.3 | 4.2 | 4.2 |
| Evaluation | Ejection property | A | A | A | A |
| | Decap property (Standby time required for maintenance (sec)) | 90 | 90 | 90 | 90 |

*1Number of moles of each monomer in 100 g of the pigment dispersant (B)

From Table 9, it is found that the water-based inks of Examples are excellent in the ejection property and the decap property.

Production Example 24 (Production of Solution of Pigment Dispersant (B-24))

A solution of pigment dispersant (B-24) was obtained in the same manner as in Production Example 1, except that the monomer composition and the amount of sodium hydroxide used for neutralization were changed to those shown in Table 10.

TABLE 10

| | | Production Example 24 |
|---|---|---|
| Pigment dispersant (B) number | | B-24 |
| Monomer composition (%) | Methacrylic acid | 17.3 |
| | MPEGMAA (n = 23) | 82.7 |
| Properties of pigment dispersant (B) | Weight-average molecular weight | 51000 |
| | Acid value (mgKOH/g) | 113 |
| Added NaOH amount (mg) | | 1209 |
| Degree of neutralization (mol %) | | 15 |
| Solid content concentration (%) of pigment dispersant (B) solution | | 20 |

Examples 7-1 to 7-3 (Water-Based Pigment Dispersions P-41 to P-43)

Water-based pigment dispersions P-41 to P-43 (solid content concentration: 20%) were obtained in the same manner as in Example 1-4 except that the following aluminum lake pigments A-2 to A-4 were used instead of the aluminum lake pigment A-1, the pigment dispersants shown in Table 11 were used instead of the pigment dispersant type B-4, and further in Example 7-3, the blending amounts were changed to those shown in Table 11.

A-2: "SunCROMA FD&C Yellow 6 Al Lake" (Yellow No. 5 aluminum lake pigment, manufactured by Sun Chemical Corporation)

A-3: "SunCROMA FD&C Blue 1 Al Lake" (Blue No. 1 aluminum lake pigment, manufactured by Sun Chemical Corporation)

A-4: "SunCROMA FD&C Red 28 Al Lake" (Red No. 104-1 aluminum lake pigment, manufactured by Sun Chemical Corporation)

[Evaluations]

<Evaluation of Effect of Reducing Dispersed Particle Diameter of Pigment>

(Volume Average Particle Diameter)

The volume average particle diameter of each of the water-based pigment dispersions of Examples 7-1 to 7-3 was measured. The results are shown in Table 11.

(Viscosity)

The viscosity of each of the water-based pigment dispersions of Examples 7-1 to 7-3 was measured. The results are shown in Table 11.

The viscosities of the water-based pigment dispersions P-41 to P-43 were all 20 mPa·s or less, and when the water-based pigment dispersions were filtered using a cellulose acetate-made syringe filter having a pore size of 5 μm, a reduction in filtration rate due to pressure loss did not occur. Also in this respect, it is found that the dispersed particle diameter of the pigment is reduced.

<Evaluation of Normal Temperature Storage Stability>

Each of the water-based pigment dispersions of Examples 7-1 to 7-3 was allowed to stand at normal temperature, the presence or absence of sediment was visually checked, and the normal temperature storage stability was evaluated according to the aforementioned evaluation criteria. The results are shown in Table 11.

<Evaluation of High Temperature Storage Stability>

Each of the water-based pigment dispersions of Examples 7-1 to 7-3 was sealed in a glass screw tube and allowed to stand in a thermostatic bath at 60° C. for 4 weeks. Then, the particle diameter was measured and the particle diameter retention rate (%) and the viscosity retention rate (%) were determined by the above equations. The results are shown in Table 11.

Furthermore, when the fluidity of the water-based pigment dispersions after storage was visually checked, it was found that the water-based pigment dispersions P-41 to P-43 maintained fluidity after storage.

<Evaluation of High Temperature Storage Stability when Diluted>

Each of the water-based pigment dispersions of Examples 7-1 to 7-3 was diluted in the same manner as described above and allowed to stand in a thermostatic bath at 60° C. for 4 weeks. Then, the particle diameter was measured and the particle diameter retention rate (%) was determined by the above equation. The results are shown in Table 11.

Furthermore, when the fluidity of the water-based pigment dispersions after storage for 4 weeks in a thermostatic bath at 60° C. was visually checked, it was found that the water-based pigment dispersions P-41 to P-43 of Examples maintained fluidity even after storage.

TABLE 11

| | | Example 7-1 | Example 7-2 | Example 7-3 | Example 1-4 |
|---|---|---|---|---|---|
| | Water-based pigment dispersion number | P-41 | P-42 | P-43 | P-4 |
| Aluminum lake pigment (A) | Number | A-2 | A-3 | A-4 | A-1 |
| | Blending amount (parts) | 13 | 13 | 10 | 13 |
| Pigment dispersant (B) solution | Pigment dispersant (B) number | B-24 | B-24 | B-19 | B-4 |
| | Blending amount as solid content (parts) | 7 | 7 | 10 | 7 |
| | Solid content concentration (%) | 20 | 20 | 20 | 20 |
| | Monomer composition (%) Methacrylic acid | 17.3 | 17.3 | 17.3 | 17.3 |
| | Monomer composition (%) MPEGMAA (n = 23) | 82.7 | 82.7 | 82.7 | 82.7 |
| | Number of moles of anionic group-containing monomer (b-1)*1 | 0.20 | 0.20 | 0.20 | 0.20 |
| | Number of moles of hydrophilic nonionic monomer (b-2)*1 | 0.07 | 0.07 | 0.07 | 0.07 |
| | Molar ratio [{monomer (b-2)}/{monomer (b-1)}] | 0.37 | 0.37 | 0.37 | 0.37 |
| | Acid value (mgKOH/g) | 113 | 113 | 113 | 113 |
| | Weight-average molecular weight | 51000 | 51000 | 51000 | 51000 |
| | Degree of neutralization (mol %) | 15 | 15 | 40 | 10 |
| Water | Blending amount (parts) | 52 | 52 | 40 | 52 |
| Water-based pigment dispersion | Mass ratio [{aluminum lake pigment (A)}/{aluminum lake pigment (A) + pigment dispersant (B)}] | 0.65 | 0.65 | 0.50 | 0.65 |
| | Solid content concentration (%) | 20 | 20 | 20 | 20 |
| | Volume average particle diameter (nm) | 137 | 146 | 107 | 131 |
| | Viscosity (mPa · s) | 5.2 | 5.1 | 8.3 | 5.1 |
| Normal temperature storage stability | Presence or absence of sediment after standing at normal temperature (25° C.) for 1 week | A | A | A | A |
| High temperature storage stability (volume average particle diameter) | Volume average particle diameter (nm) after storage at 60° C. for 4 weeks | 137 | 148 | 107 | 131 |
| | Particle diameter retention rate (%) after storage at 60° C. for 4 weeks | 100 | 101 | 100 | 100 |
| | Volume average particle diameter (nm) diluted to 10% solid content, and after storage at 60° C. for 4 weeks | 137 | 148 | 107 | 131 |
| | Particle diameter retention rate (%) diluted to 10% solid content, and after storage at 60° C. for 4 weeks | 100 | 101 | 100 | 100 |
| High temperature storage stability (viscosity) | Viscosity (mPa · s) after storage at 60° C. for 4 weeks | 5.2 | 4.8 | 7.5 | 4.8 |
| | Viscosity retention rate (%) after storage at 60° C. for 4 weeks | 100 | 94 | 90 | 94 |

*1Number of moles of each monomer in 100 g of the pigment dispersant (B)

From Table 11, it is found that the water-based pigment dispersions of Examples have a high effect of reducing the dispersed particle diameter of the pigment and are excellent in normal temperature storage stability.

In addition, since the water-based pigment dispersions of Examples have a particle diameter retention rate of less than 110% and a viscosity retention rate of 90% or more and 110% or less in the evaluation of high temperature storage stability, it is found that even a high concentration pigment dispersion having a solid content concentration of 20% can be stored at a high temperature for a long period of time.

In addition, it is found that the water-based pigment dispersions of Examples can be stored for a long period of time even at a high temperature by preparing a water-based pigment dispersion having a solid content concentration of 10%, since the particle diameter retention rate is less than 110% when the solid content concentration is diluted to 10% in the evaluation of high temperature storage stability. For this reason, the pigment dispersion of the present invention can be made to have excellent high temperature storage stability by diluting the pigment dispersion to such an extent that there is no problem in blending the pigment dispersion into an ink.

Examples 8-1 to 8-3 (Water-Based Inks I-41 to I-43)

Each water-based ink was obtained in the same manner as in Example 2-1 except that the water-based pigment dispersion shown in Table 12 was used instead of the water-based pigment dispersion P-1, the amounts of glycerin and Liponic EG-1 (glycerin-modified E0 adduct) were adjusted to the amounts shown in Table 12 as necessary so that the viscosity at 20° C. was between 4.0 and 4.4 mPa·s, and the amount of residual water was adjusted. Using each of the obtained water-based inks, the aforementioned ejection property and decap property were evaluated. The results are shown in Table 12.

TABLE 12

| | | | Example 8-1 | Example 8-2 | Example 8-3 | Example 2-4 |
|---|---|---|---|---|---|---|
| Ink number | | | I-41 | I-42 | I-43 | I-4 |
| Water-based pigment dispersion number | | | P-41 | P-42 | P-43 | P-4 |
| Aluminum lake pigment (A) | Number | | A-2 | A-3 | A-4 | A-1 |
| Pigment dispersant (B) | Number | | B-24 | B-24 | B-19 | B-4 |
| | Monomer composition (%) | Methacrylic acid | 17.3 | 17.3 | 17.3 | 17.3 |
| | | MPEGMAA (n = 23) | 82.7 | 82.7 | 82.7 | 82.7 |
| | Number of moles of anionic group-containing monomer (b-1)*1 | | 0.20 | 0.20 | 0.20 | 0.20 |
| | Number of moles of hydrophilic nonionic monomer (b-2)*1 | | 0.07 | 0.07 | 0.07 | 0.07 |
| | Molar ratio [{monomer (b-2)}/{monomer (b-1)}] | | 0.37 | 0.37 | 0.37 | 0.37 |
| | Acid value (mgKOH/g) | | 113 | 113 | 113 | 113 |
| | Weight-average molecular weight | | 51000 | 51000 | 51000 | 51000 |
| | Degree of neutralization (mol %) | | 15 | 15 | 40 | 10 |
| Water-based ink blend composition (parts) | Water-based pigment dispersion | | 30.77 | 30.77 | 30.00 | 30.77 |
| | Glycerin | | 15 | 15 | 16 | 15 |
| | Liponic EG-1 | | 5 | 5 | 4 | 5 |
| | 1,2-hexandiol | | 3 | 3 | 3 | 3 |
| | Water | | 46.23 | 46.23 | 47.00 | 46.23 |
| Content (%) of aluminum lake pigment (A) in water-based ink | | | 4 | 4 | 3 | 4 |
| Content (%) of pigment dispersant (B) in water-based ink | | | 2.15 | 2.15 | 3.00 | 2.15 |
| Mass ratio of water-based ink [{aluminum lake pigment (A)}/{aluminum lake pigment (A) + pigment dispersant (B)}] | | | 0.65 | 0.65 | 0.50 | 0.65 |
| Viscosity (mPa · s) of water-based ink | | | 4.0 | 4.0 | 4.2 | 4.0 |
| Evaluation | Ejection property | | A | A | A | A |
| | Decap property (Standby time required for maintenance (sec)) | | 120 | 120 | 120 | 120 |

*1Number of moles of each monomer in 100 g of the pigment dispersant (B)

From Table 12, it is found that the water-based inks of Examples are excellent in the ejection property and the decap property.

INDUSTRIAL APPLICABILITY

According to the present invention, it is possible to provide a water-based pigment dispersion in which the dispersed particle diameter of the pigment is small and which is excellent in normal temperature storage stability and high temperature storage stability, and a water-based ink containing the water-based pigment dispersion is excellent in ejection property and decap property, and therefore is suitable as a water-based ink for ink-jet recording. Since the water-based pigment dispersion of the present invention contains the pigment (A) in the form of an aluminum lake, from the viewpoint of safety, it can be used in the food field, the medical field, the cosmetic field, and the like, and even in a case where the water-based pigment dispersion is applied to the skin, hair, or nails, similar effects can be exhibited.

The invention claimed is:

1. A water-based pigment dispersion comprising an aluminum lake pigment (A) and a pigment dispersant (B), wherein the pigment dispersant (B) is a polymer comprising a constituent unit derived from an anionic group-containing monomer (b-1) and a constituent unit derived from a hydrophilic nonionic monomer (b-2) comprising an oxyalkylene group, the content of the constituent unit derived from an anionic group-containing monomer (b-1) in all the constituent units of the dispersant (B) is 3% by mass or more and 40% by mass or less, and the content of the constituent unit derived from a hydrophilic nonionic monomer (b-2) in all the constituent units of the dispersant (B) is 60% by mass or more and 97% by mass or less, at least a part of the anionic group of the pigment dispersant (B) is neutralized, and the pigment dispersant (B) has degree of neutralization of 5 mol % or more and 30 mol % or less.

2. The water-based pigment dispersion according to claim 1, wherein the aluminum lake pigment (A) is one or more selected from the group consisting of Yellow No. 4 aluminum lake, Yellow No. 5 aluminum lake, Blue No. 1 aluminum lake, and Red No. 104-(1) aluminum lake.

3. The water-based pigment dispersion according to claim 1, wherein the hydrophilic nonionic monomer (b-2) has a polyoxyalkylene group, and an average addition mole number of alkylene oxide in the polyoxyalkylene group is 2 or more and 120 or less.

4. The water-based pigment dispersion according to claim 1, wherein the hydrophilic nonionic monomer (b-2) is an alkoxypolyalkylene glycol mono(meth)acrylate.

5. The water-based pigment dispersion according to claim 1, wherein a content of the constituent unit derived from the hydrophilic nonionic monomer (b-2) in all constituent units of the pigment dispersant (B) is 65% by mass or more and 93% by mass or less.

6. The water-based pigment dispersion according to claim 1, wherein a content of the constituent unit derived from the anionic group-containing monomer (b-1) in all constituent units of the pigment dispersant (B) is 7% by mass or more and 35% by mass or less.

7. The water-based pigment dispersion according to claim 1, wherein a mass ratio of a content of the aluminum lake pigment (A) to a total content of the aluminum lake pigment (A) and the pigment dispersant (B) [{aluminum lake pigment (A)}/{aluminum lake pigment (A)+pigment dispersant (B)}] is 0.30 or more and 0.90 or less.

8. The water-based pigment dispersion according to claim 1, wherein the pigment dispersant (B) has an acid value of 25 mgKOH/g or more and 350 mgKOH/g or less.

9. The water-based pigment dispersion according to claim 1, wherein at least a part of the anionic group of the pigment dispersant (B) is neutralized, and the pigment dispersant (B) has a degree of neutralization of 7 mol % or more and 30 mol % or less.

10. The water-based pigment dispersion according to claim 1, wherein a content of water is 50% by mass or more and 95% by mass or less.

11. The water-based pigment dispersion according to claim 1, wherein the constituent unit derived from the hydrophilic nonionic monomer (b-2) is a constituent unit derived from polyalkylene glycol (meth)acrylate represented by the following formula (1),

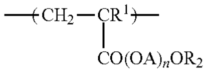

(1)

wherein $R^1$ represents a hydrogen atom or a methyl group, $R^2$ represents a hydrogen atom or an alkyl group having 1 or more and 20 or less carbon atoms, OA represents an oxyalkylene group having 2 or more and 4 or less carbon atoms, and n represents an average addition mole number of alkylene oxides and is a number of 2 or more and 120 or less.

12. The water-based pigment dispersion according to claim 1, wherein the anionic group-containing monomer (b-1) is (meth)acrylic acid.

13. The water-based pigment dispersion according to claim 1, wherein a ratio of a number of moles of the constituent unit derived from the hydrophilic nonionic monomer (b-2) to a number of moles of the constituent unit derived from the anionic group-containing monomer (b-1) comprised in the dispersant (B), [{monomer (b-2)}/{monomer (b-1)}]), is 0.05 or more and 2.5 or less.

14. The water-based pigment dispersion according to claim 1, wherein a volume average particle diameter of the water-based pigment dispersion is 50 nm or more and 200 nm or less.

15. A water-based ink for ink-jet recording, comprising the water-based pigment dispersion according to claim 1, and a water-soluble organic solvent (C).

16. An ink-jet recording method, comprising ejecting the water-based ink for ink-jet recording according to claim 15 onto a recording medium with a thermal type ejection head.

17. The water-based ink for ink-jet recording according to claim 15, wherein a content of the aluminum lake pigment (A) is 2% by mass or more.

18. The water-based ink for ink-jet recording according to claim 15, wherein the water-based ink has a pH of 5 or more and 7 or less.

19. The water-based ink for ink-jet recording according to claim 15, wherein the water-soluble organic solvent (C) is one or more selected from the group consisting of polyhydric alcohols and polyhydric alcohol-modified alkylene oxide adducts.

20. The water-based ink for ink-jet recording according to claim 15, wherein a content of water in the water-based ink is 40% by mass or more and 90% by mass or less.

* * * * *